(12) United States Patent
Määttänen et al.

(10) Patent No.: US 10,516,506 B2
(45) Date of Patent: *Dec. 24, 2019

(54) SHORT PUCCH IN UPLINK SPUCCH

(71) Applicant: Telefonaktiebolaget LM Ericsson (publ), Stockholm (SE)

(72) Inventors: Helka-Liina Määttänen, Helsinki (FI); Mattias Andersson, Stockholm (SE); Stefan Parkvall, Bromma (SE); Per Synnergren, Gammelstad (SE); Stefan Wager, Espoo (FI); Hanzhi Zhang, Munich (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/034,027

(22) Filed: Jul. 12, 2018

(65) Prior Publication Data

US 2018/0323910 A1  Nov. 8, 2018

Related U.S. Application Data

(63) Continuation of application No. 15/689,086, filed on Aug. 29, 2017, now Pat. No. 10,050,747, which is a
(Continued)

(51) Int. Cl.
*H04L 27/18* (2006.01)
*H04L 1/18* (2006.01)
(Continued)

(52) U.S. Cl.
CPC ......... *H04L 1/1812* (2013.01); *H04B 7/0626* (2013.01); *H04L 1/1671* (2013.01);
(Continued)

(58) Field of Classification Search
CPC ... H04L 1/1812; H04L 1/1671; H04B 7/0626; H04J 11/0073; H04W 72/04; H04W 52/34
(Continued)

(56) References Cited

U.S. PATENT DOCUMENTS 9,762,357 B2  9/2017  Maattanen et al.
2008/0080364 A1  4/2008  Barak et al.
(Continued)

FOREIGN PATENT DOCUMENTS

EP  2249598 A1  11/2010
WO  2014110467 A1  7/2014
WO  2016040290 A1  3/2016

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 1-141.
(Continued)

*Primary Examiner* — Khai Tran
(74) *Attorney, Agent, or Firm* — Murphy, Bilak & Homiller, PLLC

(57) ABSTRACT

In one aspect, a wireless device receives a first data transmission from a base station in a first subframe interval and transmits HARQ feedback and/or CSI to the base station in a subsequent subframe interval, within a duration that is less than a maximum transmission duration that is possible within the subsequent subframe interval. In another aspect, a base station transmits a first data transmission to a wireless device in a first subframe interval and receives HARQ feedback and/or CSI from the wireless device in a subsequent subframe interval, within a duration that is less than a
(Continued)

maximum transmission duration that is possible within the subsequent subframe interval.

41 Claims, 21 Drawing Sheets

Related U.S. Application Data continuation of application No. 15/024,718, filed as application No. PCT/SE2016/050183 on Mar. 9, 2016, now Pat. No. 9,762,357.

(60) Provisional application No. 62/130,331, filed on Mar. 9, 2015.

(51) Int. Cl.

| | | |
|---|---|---|
| *H04L 1/16* | (2006.01) | |
| *H04L 5/00* | (2006.01) | |
| *H04B 7/06* | (2006.01) | |
| *H04L 27/227* | (2006.01) | |
| *H04L 27/26* | (2006.01) | |
| *H04W 72/04* | (2009.01) | |
| *H04W 88/02* | (2009.01) | |
| *H04W 88/08* | (2009.01) | |

(52) U.S. Cl.
CPC ............ *H04L 1/1861* (2013.01); *H04L 5/005* (2013.01); *H04L 5/0055* (2013.01); *H04L 27/18* (2013.01); *H04L 27/2278* (2013.01); *H04L 27/265* (2013.01); *H04L 5/0057* (2013.01); *H04L 27/2601* (2013.01); *H04W 72/0413* (2013.01); *H04W 88/02* (2013.01); *H04W 88/08* (2013.01)

(58) Field of Classification Search
USPC .......................... 375/279, 308; 370/328, 329
See application file for complete search history.

(56) References Cited

U.S. PATENT DOCUMENTS

| | | |
|---|---|---|
| 2012/0243515 A1 | 9/2012 | Xue et al. |
| 2013/0044653 A1 | 2/2013 | Yang et al. |
| 2013/0058282 A1 | 3/2013 | Miki et al. |
| 2013/0343313 A1 | 12/2013 | Takeda et al. |
| 2014/0301306 A1 | 10/2014 | Kim et al. |
| 2015/0358111 A1 | 12/2015 | Marinier et al. |
| 2016/0330763 A1 | 11/2016 | Marinier et al. |
| 2019/0021102 A1* | 1/2019 | Wang ................ H04W 72/0413 |
| 2019/0044639 A1* | 2/2019 | Ouchi ................. H04J 11/0073 |

OTHER PUBLICATIONS

Dahlman, Erik, et al., "4G LTE/LTE-Advanced for Mobile Broadband", Academic Press, Oxford, UK, 2011, 226-242.

Unknown, Author, "Study on Latency reduction techniques for LTE", Ericsson, RP-150310—Motivation for new proposed SI, Sep. 2014, 1-16.

So-In, Chakchai, et al., "Resource Allocation in IEEE 802.16 Mobile WiMAX", Orthogonal Frequency Division Multiple Access (OFDMA), Apr. 2010, 1-48.

3GPP, "3rd Generation Partnership Project; Technical Specification Group Radio Access Network; Evolved Universal Terrestrial Radio Access (E-UTRA); Multiplexing and channel coding (Release 10)", DRAFT 3GPP TS 36.212 Va.0.0, Dec. 2010, 1-71.

Unknown, Author, "Coding for Short Blocks in Control Channel", Nokia, Alcatel-Lucent Shanghai Bell, 3GPP TSG-RAN WG1#NR Ad-Hoc Meeting, R1-1701034, Spokane, U.S.A., Jan. 16-20, 2017, 1-5.

Unknown, Author, "Design aspects of sPUCCH", Ericsson, 3GPP TSG-RAN WG1 #88, R1-1703262, Athens, Greece, Feb. 13-17, 2017, 1-10.

* cited by examiner

| | |
|---|---|
| PUCCH m=1 | PUCCH m=0 |
| SC-sPUCCH m=2 | SC-sPUCCH m=4 |
| PUSCH | |
| SC-sPUCCH m=3 | SC-sPUCCH m=5 |
| PUCCH m=0 | PUCCH m=1 |

| | |
|---|---|
| PUCCH m=1 | PUCCH m=0 |
| MC-sPUCCH m=2 | MC-sPUCCH m=3 |
| PUSCH | |
| MC-sPUCCH m=2 | MC-sPUCCH m=3 |
| PUCCH m=0 | PUCCH m=1 |

FIG. 14

| PUCCH m=1 | SC-sPUCCH m=2 | PUSCH | SC-sPUCCH m=3 | PUCCH m=0 | PUCCH m=0 | SC-sPUCCH m=4 | | SC-sPUCCH m=5 | PUCCH m=1 |

FIG. 15

SHORT PUCCH IN UPLINK SPUCCH

TECHNICAL FIELD

The present application is generally related to wireless communications systems and is more specifically related to hybrid Automatic Repeat Request (HARQ) transmission in systems where data transmissions are scheduled for durations of less than a subframe.

BACKGROUND

For error control, the fourth-generation (4G) wireless system known as "Long-Term Evolution (LTE), standardized by members of the $3^{rd}$-Generation Partnership Project (3GPP), uses hybrid-ARQ (HARQ). After receiving downlink data in a subframe, the mobile terminal attempts to decode it and report, via a Physical Uplink Control Channel (PUCCH), to the base station whether (ACK) or not (NACK) the decoding was successful. In the event of an unsuccessful decoding attempt, the base station (eNodeB or eNB) can retransmit the erroneous data. Similarly, the base station can indicate to the mobile terminal whether the decoding of the Physical Uplink Shared Channel (PUSCH) was successful (ACK) or not (NACK) via the Physical Hybrid ARQ Indicator Channel (PHICH).

In addition to the hybrid-ARQ ACK/NACK information transmitted from the mobile terminal to the base station, uplink control signaling from the mobile terminal to the base station also includes reports related to the downlink channel conditions, referred to generally as channel-state information (CSI) or channel-quality information (CQI). This CSI/CQI is used by the base station to assist in downlink resource scheduling decisions. Because LTE systems rely on dynamic scheduling of both downlink and uplink resources, uplink control-channel information also includes scheduling requests, which the mobile terminal sends to indicate that it needs uplink traffic-channel resources for uplink data transmissions.

Packet data latency is one of the performance metrics that vendors, operators and also end-users (via speed test applications) regularly measure. Latency measurements are done in all phases of a radio access network system lifetime, e.g., when verifying a new software release or system component, when deploying a system, and when the system is in commercial operation.

Improved latency compared to previous generations of 3GPP radio access technologies (RATs) was one performance metric that guided the design of LTE. LTE is also now recognized by its end users to be a system that provides faster access to internet and lower data latencies than previous generations of mobile radio technologies.

Packet data latency is important not only for the perceived responsiveness of the system, but is also a parameter that indirectly influences the throughput of the system. HTTP/TCP is the dominating application and transport layer protocol suite used on the Internet today. According to HTTP Archive (http://httparchive.org/trends.php), the typical size of HTTP based transactions over the Internet is in the range of a few tens of kilobytes up to 1 Mbyte. In this size range, the Transport Control Protocol (TCP) slow-start period is a significant part of the total transport period of the packet stream. During TCP slow start, the performance is latency limited. Hence, improved latency can rather easily be shown to improve the average throughput for this type of TCP based data transactions.

Radio resource efficiency can also be positively impacted by latency reductions. Lower packet data latency can increase the number of transmissions possible within a certain delay bound; hence, higher block-error rate (BLER) targets could be used for the data transmissions, freeing up radio resources and potentially improving the capacity of the system. It should also be noted that reduced latency of data transport may also indirectly give faster radio control plane procedures like call set-up/bearer set-up, due to the faster transport of higher layer control signaling.

There are several current applications that will be positively impacted by reduced latency, in terms of increased perceived quality of experience. Examples are gaming and real-time applications like Voice over LTE/Over-the-top voice over IP (VoLTE/OTT VoIP) and multi-party video conferencing. In the future, there will be a number of new applications that will be more delay critical. Examples may be remote control/driving of vehicles, augmented reality applications in, e.g., smart glasses, or specific machine communications requiring low latency.

LTE is a radio access technology based on radio access network control and scheduling. These facts impact the latency performance since a transmission of data need a round trip of lower layer control signaling. An example of this lower layer control signaling is shown in FIG. 1. The data is created by higher layers at T0. Then, the user equipment (UE) sends a scheduling request (SR) to the eNB to obtain resources for sending the data to the network. The eNB processes this SR and responds with a grant of uplink resources. After that, the data transfer can start, as shown at T6 in the figure.

When it comes to packet latency reductions, one area to address is the reduction of transport time of data and control signaling, e.g., by addressing the length of a transmit-time-interval (TTI), and the reduction of processing time of control signaling, e.g., by reducing the time it takes for a UE to process a grant signal.

SUMMARY

One way to reduce the latency for terminal receiver processing is to allow for downlink transmissions, e.g., transmissions on the physical downlink shared channel (PDSCH) in LTE, that are shorter than the current transmit-time interval (TTI) of one subframe, e.g., that occupy fewer than all of the orthogonal frequency-division multiplexing (OFDM) symbols allocated to the PDSCH in an LTE subframe. These downlink transmissions may be referred to as sub-subframe (SSF) transmissions. Acknowledging these sub-subframe (SSF) downlink transmissions in a way that fully enables the latency benefits possible with SSF transmissions, however, requires modifications to uplink resource allocation and uplink control channels. For example, the LTE PUCCH needs to occupy less than the 1 ms uplink subframe. In addition to shorted uplink PUCCH formats, resource allocation and multiplexing can solve the issue of acknowledging downlink transmissions that use the sPDSCH, while keeping backwards compatibility with the current PUCCH structure in LTE. Taken together or separately, various embodiments described herein may be used in such a way that both legacy UEs and new UEs use PUCCH in the same way in a system that allows simultaneous use of subframes with 1-millisecond timing and SSFs with e.g., 0.5-millisecond timing. This simplifies UE design and network design.

According to some embodiments, a method, in a wireless device that receives a data transmission in a first subframe and acknowledges that transmission with ACK/NACK feedback in a subsequent subframe, includes receiving a first data transmission from a second wireless device in a first subframe interval, and transmitting HARQ feedback and/or CSI to the second wireless device in a subsequent subframe interval, within a duration that is less than a maximum transmission duration that is possible within the subsequent subframe interval. For example, the HARQ feedback and/or CSI may be transmitted by an LTE UE using an SSF allocation of downlink resources that is less than a TTI of the subsequent subframe. This SSF allocation may be one of two slots in the subsequent subframe, for example.

According to some embodiments, a method, in a wireless device that transmits a data transmission in a first subframe and receives an acknowledgement of that transmission in ACK/NACK feedback received in a subsequent subframe, includes transmitting a first data transmission to a second wireless device in a first subframe interval, and receiving HARQ feedback and/CSI from the second wireless device in a subsequent subframe interval, within a duration that is less than a maximum transmission duration that is possible within the subsequent subframe interval. The wireless device may be an LTE eNodeB.

According to some embodiments, a wireless device has a transceiver circuit and a processing circuit configured to perform either of these methods. Variations of the above-described methods, as well as corresponding apparatuses, computer program products, computer readable medium and functional implementations are described in detail below. Thus, the disclosed techniques are not limited to the above-summarized features and advantages. Indeed, those skilled in the art will recognize additional features and advantages upon reading the following detailed description, and upon viewing the accompanying drawings.

BRIEF DESCRIPTION OF THE DRAWINGS

FIG. 14 illustrates an example of a minimum impact slot-based sPUCCH solution, according to some embodiments.

FIG. 15 illustrates an example of single-carrier (SC) short PUCCH allocation with frequency domain diversity, according to some embodiments.

DETAILED DESCRIPTION

Figure 1:
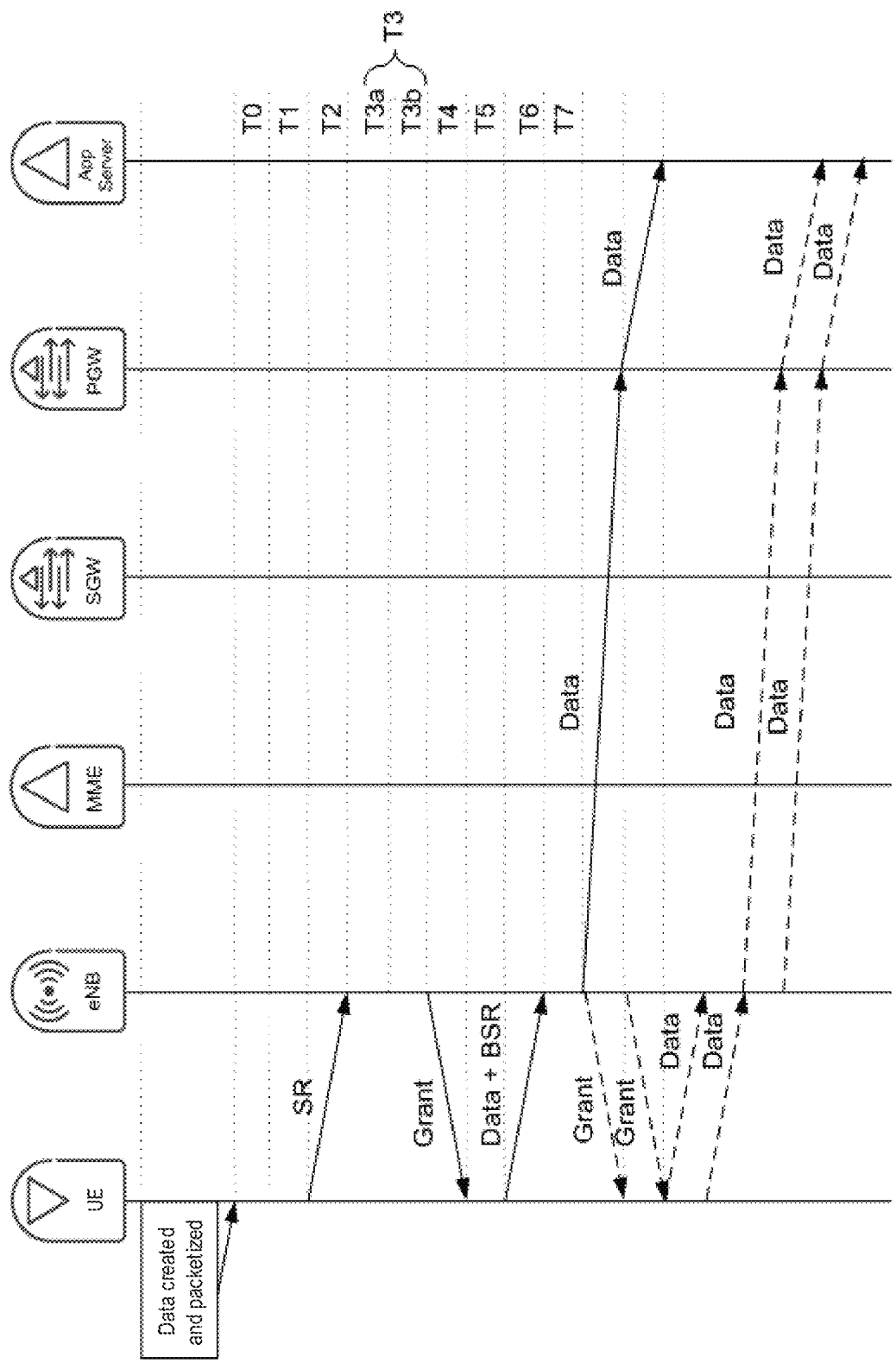
FIG. 1 illustrates an example of control signal timing for scheduling requests in an LTE system.

As noted above, when it comes to reducing packet latency, one area to address is the reduction of transport time of data and control signaling, e.g., by addressing the length of a transmit-time-interval (TTI), and the reduction of processing time of control signaling, e.g., by reducing the time it takes for a UE to process a grant signal.

In a typical UE design, the UE receives an entire subframe before any processing of that subframe is started. For channel estimation purposes, there may be some look-ahead to obtain cell-specific reference symbols (CRS) from the following subframe, which will introduce a delay of one or a few symbols. Then, the demodulation of symbols in the received subframe and generation of soft values will take place, followed by turbo decoding. The time required for these operations is generally dependent on the size of the received transport block, and the processing chain of the UE is designed to allow for reception in the worst-case scenario, i.e., a scenario involving a maximum-size allocation and the most complex modulations and code rates, possibly on each of a number of aggregated component carriers. Further, the UE needs to complete processing on all of these blocks with an additional margin, as given by the maximum timing advance value. The timing advance is configured from the network to make the signals from different UEs arrive at the eNodeB at similar time instants—for large cell sizes, the timing advance may be specified to values up to 0.7 milliseconds, corresponding to the round-trip time of radio signals given a cell radius of about 100 kilometers.

One way to reduce the latency associated with decoding the data is to change the channel estimator and not employ any form of look ahead. The channel estimate is then available earlier, which allows demodulation and decoding to begin earlier. Similarly, since the time needed for turbo decoding depends on the code block size, latency can be further reduced by reducing the code block size. Hence, if the code block size (or equivalently the transport block size) is reduced, the decoding result will be available earlier (for a given decoding capability, in terms of number of parallel decoders). If instead of transmitting a single large code block of length 6000 bits once every millisecond, the system transmits two consecutives blocks of length 3000 bits every 0.5 milliseconds, the decoding latency for each block may be reduced by roughly one-half, while still sustaining the bit rate at roughly the same complexity. It should be noted that some performance degradations are expected from shorter block lengths and/or from eliminating look-aheads for channel estimation. In general, tradeoffs between latency and receiver performance can be expected. However, these tradeoffs need not necessarily diminish system or end user performance.

Given the discussion of receiver processing above, there is an opportunity to reduce the latency for terminal receiver processing by allowing for downlink transmissions, i.e., transmissions on the physical downlink shared channel (PDSCH), that are shorter than the current transmit-time interval (TTI) of one subframe in LTE systems, i.e., that occupy fewer than all of the orthogonal frequency-division multiplexing (OFDM) symbols allocated to the PDSCH in a subframe. These downlink transmissions may be referred to as sub-subframe (SSF) transmissions. In other words, the LTE system could be modified to not only allow PDSCH assignments covering all OFDM symbols in a 1 ms subframe, but also have PDSCH assignments with shorter durations, covering a lower number of consecutive OFDM symbols within a subframe. The duration of the assignment might vary from subframe to subframe.

Figure 2:
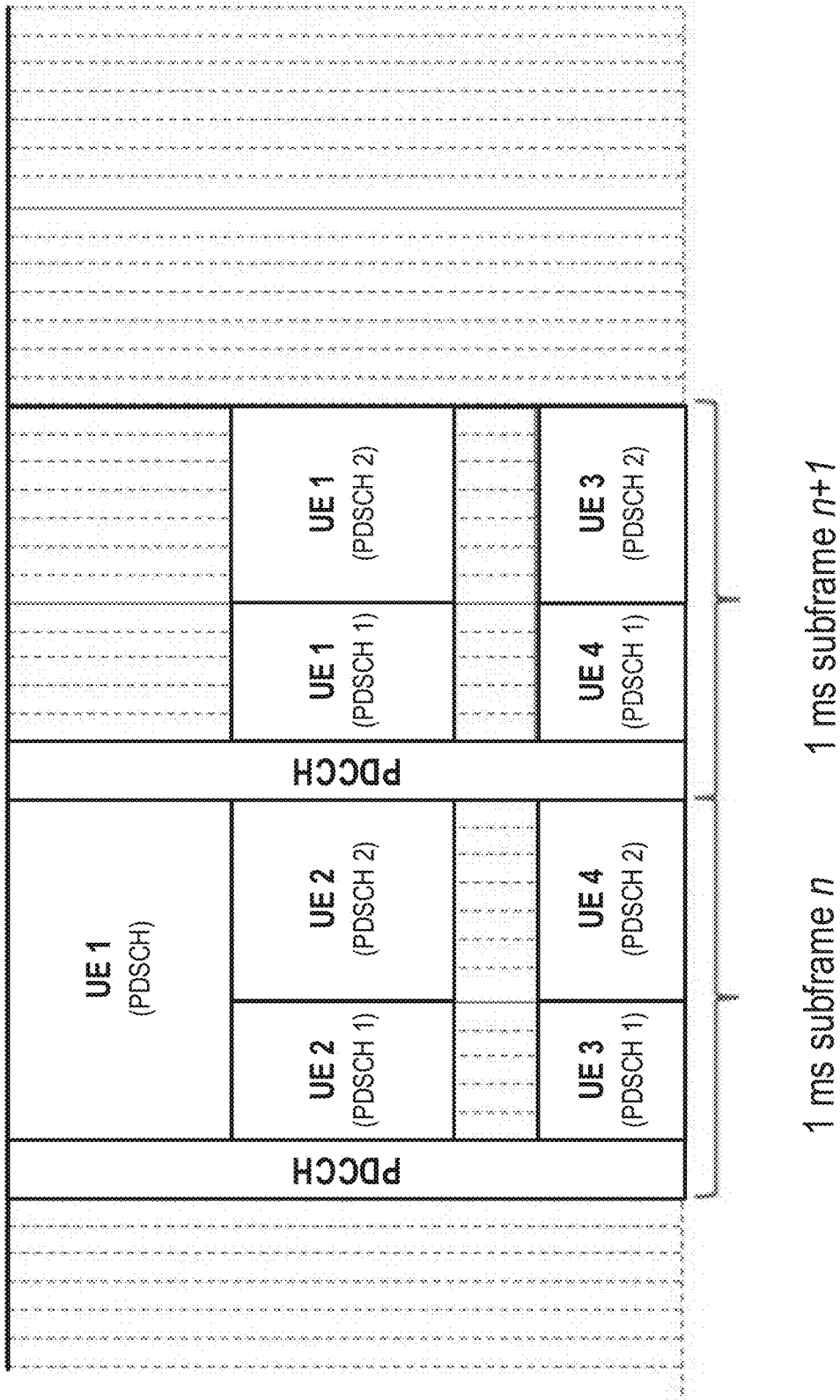
FIG. 2 illustrates examples of sub-subframe resource allocations in the downlink of an LTE system.

An example of this approach is illustrated in FIG. 2, where UE 1 has received a conventional (or "legacy") downlink grant in subframe n, such that it receives a single transport block that occupies all of the OFDM symbols allocated to PDSCH in the subframe, i.e., all of the OFDM symbols other than those reserved for the Physical Downlink Control Channel (PDCCH). UE 2, on the other hand, has received two distinct grants for subframe n—the first is received in the PDSCH symbols in the first slot of subframe n, while the other occupies the second slot. UE 3 and UE 4 each receive a downlink transmission in a single slot of subframe n. As seen in the figure, the downlink resource grants may change for the subsequent subframe, i.e., subframe n+1.

In future versions of the LTE standard, it is expected that terminals may have PDSCH assignments that, in the time domain, span a subset of the OFDM symbols in a subframe, rather than all of the OFDM symbols used for PDSCH (i.e., all symbols except symbols used by PDCCH and other good signals). Note that FIG. 2 does not show existing or future signals such as CRS, CSI reference signals (CSI-RS), and enhanced PDCCH (EPDCCH), meaning that all resource elements within the OFDM symbols used for resource assignments may not be available for data transmission.

There are several different ways in which such resource assignments, which might be referred to as "sub-subframe assignments," can be conveyed to the terminal. One way is via a PDCCH control message transmitted every one millisecond, using a modified version of the Downlink Control Information (DCI) message formats standardized by the 3GPP as of Release 11 of the specifications for LTE. Another is to use an entirely new form of PDCCH, also referred to as "short PDCCH" (SPDCCH), one or more of which may be transmitted in any given subframe.

For illustrative purposes, several embodiments will be described in the context of an LTE system. Those skilled in the art will appreciate, however, that several embodiments of the disclosed techniques may be more generally applicable to other wireless communication systems, including, for example, WiMax (IEEE 802.16) systems. Further, while the following description of certain embodiments of the invention will focus on downlink resource assignments and the corresponding HARQ transmissions in the uplink, it should be appreciated that the described techniques may be applied in the reverse direction, i.e., for uplink resource assignments and data transmissions and corresponding HARQ transmissions in the downlink. Likewise, the same techniques may be adapted for peer-to-peer transmissions, in some embodiments, where there is no "uplink" or "downlink" per se.

Figure 3:
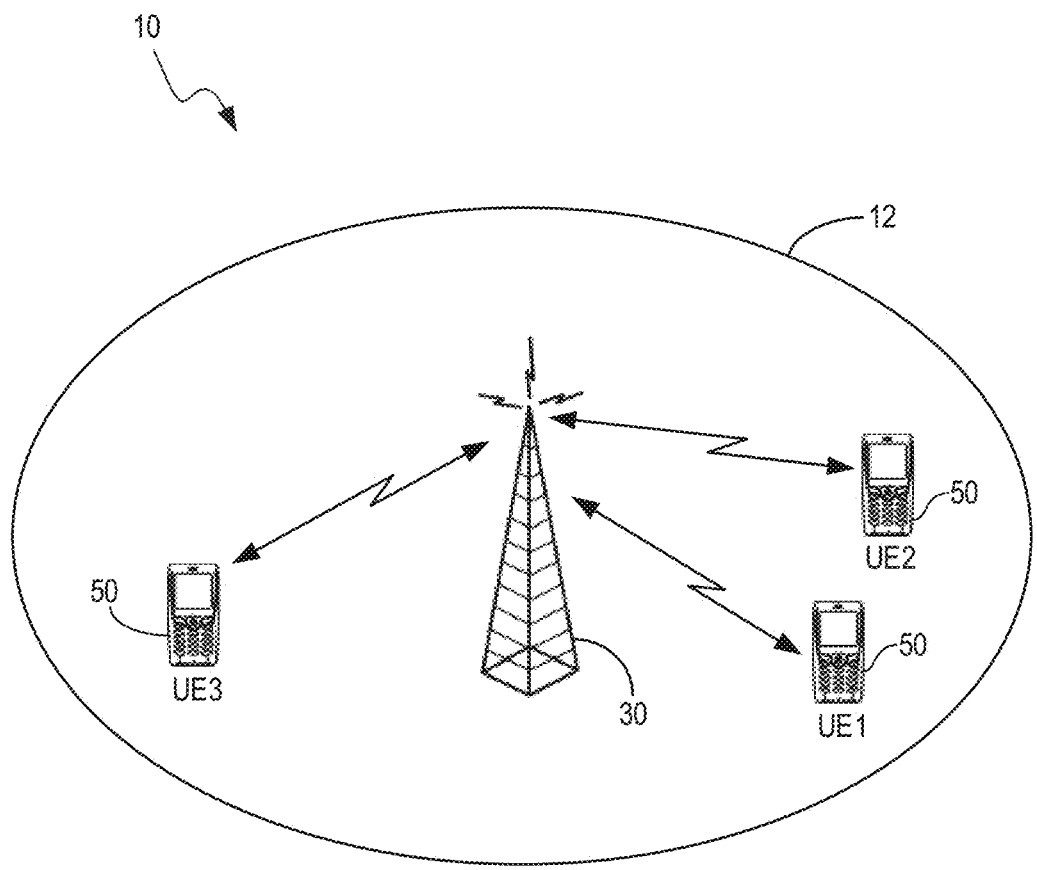
FIG. 3 illustrates an example of a mobile communication system.

FIG. 3 illustrates an exemplary mobile communication network 10 for providing wireless communication services to mobile terminals 50. Three mobile terminals 50, which are referred to as "user equipment" or "UE" in LTE terminology, are shown in FIG. 3. The mobile terminals 50 may comprise, for example, cellular telephones, personal digital assistants, smart phones, laptop computers, handheld computers, or other devices with wireless communication capabilities. It should be noted that the term "mobile terminal," as used herein, refers to a terminal operating in a mobile communication network and does not necessarily imply that the terminal itself is mobile or moveable. Thus, the term may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 30, which is referred to in LTE as a NodeB or Evolved NodeB (eNodeB). One base station 30 may provide service in multiple geographic cell areas or sectors 12. The mobile terminals 50 receive signals from base station 30 on one or more downlink (DL) channels, and transmit signals to the base station 30 on one or more uplink (UL) channels.

Figure 4:
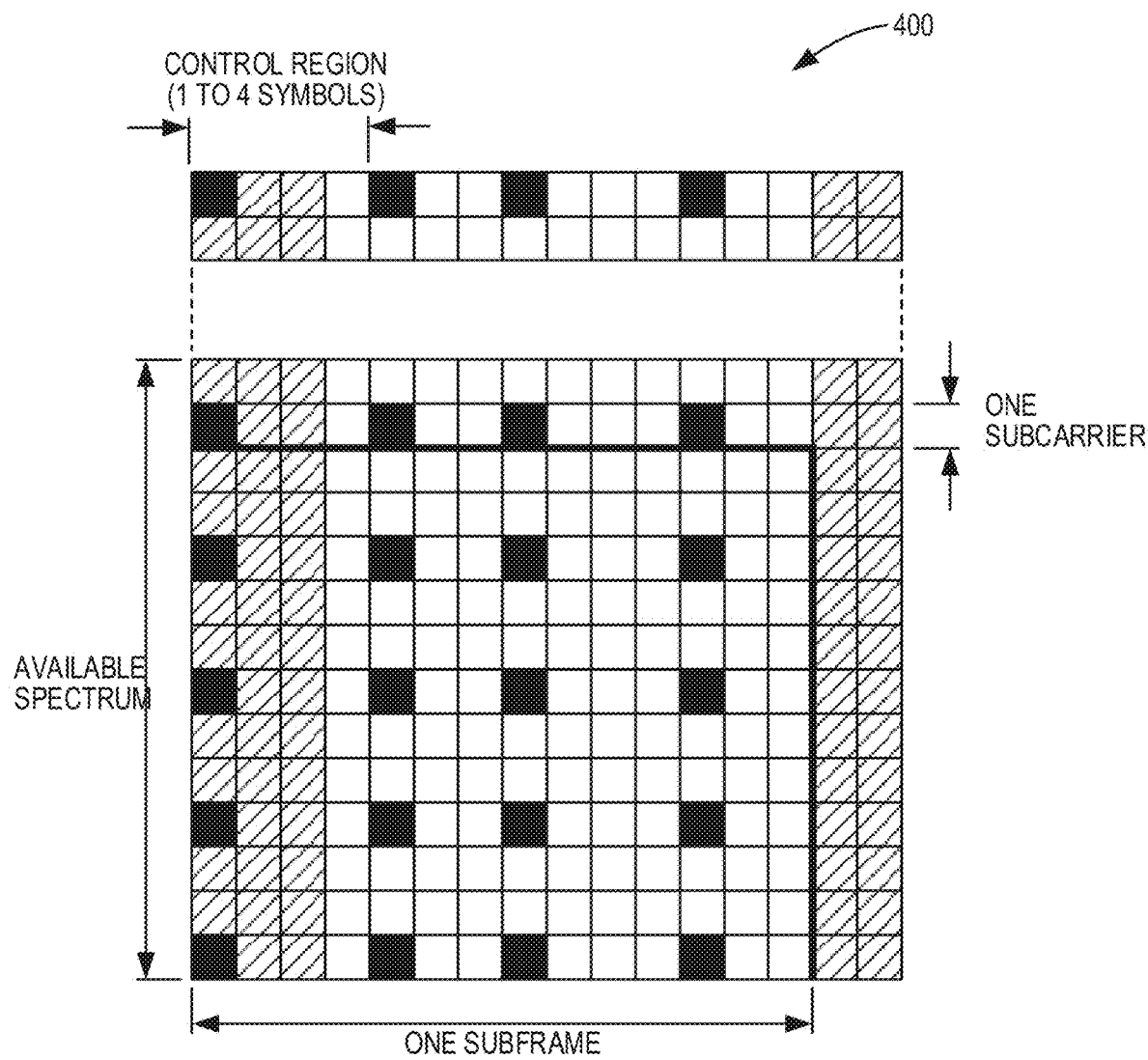
FIG. 4 illustrates a grid of time-frequency resources for a mobile communication system that uses OFDM.

LTE uses Orthogonal Frequency Division Multiplexing (OFDM) in the downlink and Discrete Fourier Transform (DFT)-spread OFDM in the uplink. The basic LTE downlink physical resource can be viewed as a time-frequency grid. FIG. 4 illustrates a portion of the available spectrum of an exemplary OFDM time-frequency grid 400 for LTE. Generally speaking, the time-frequency grid 400 is divided into one millisecond subframes. Each subframe includes a number of OFDM symbols. For a normal cyclic prefix (CP) length, suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 400 is a resource element. A resource element consists of one OFDM subcarrier during one OFDM symbol interval.

Resource elements are grouped into resource blocks, where each resource block in turn consists of twelve OFDM subcarriers, within one of two equal-length slots of a subframe. FIG. 4 illustrates a resource block pair, comprising a total of 168 resource elements.

Downlink transmissions are dynamically scheduled, in that in each subframe the base station transmits control information identifying the mobile terminals to which data is transmitted and the resource blocks in which that data is transmitted, for the current downlink subframe. This control signaling is typically transmitted in a control region, which occupies the first one, two, three, or four OFDM symbols in each subframe. A downlink system with a control region of three OFDM symbols is illustrated in FIG. 4. The dynamic scheduling information is communicated to the UEs via a Physical Downlink Control Channel (PDCCH) transmitted in the control region. After successful decoding of a PDCCH, the UE performs reception of traffic data from the Physical Downlink Shared Channel (PDSCH) or transmission of traffic data on the Physical Uplink Shared Channel (PUSCH), according to pre-determined timing specified in the LTE specifications.

Figure 5:
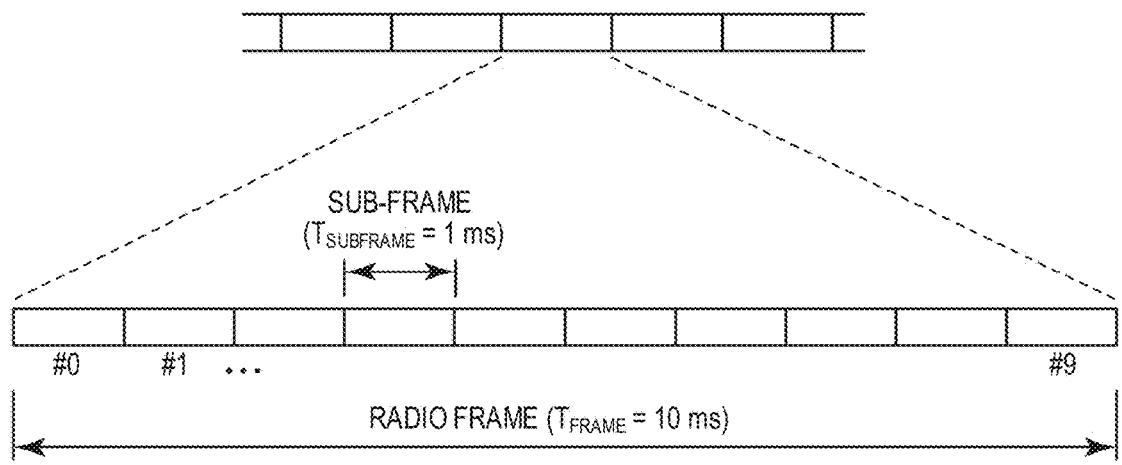
FIG. 5 illustrates the time-domain structure of an LTE signal.

As shown in FIG. 5, LTE downlink transmissions are further organized into radio frames of 10 milliseconds, in the time domain, each radio frame consisting of ten subframes. Each subframe can further be divided into two slots of 0.5 milliseconds duration. Furthermore, resource allocations in LTE are often described in terms of resource blocks, where a resource block corresponds to one slot (0.5 ms) in the time domain and twelve contiguous subcarriers in the frequency domain. Resource blocks are numbered in the frequency domain, starting with 0 from one end of the system bandwidth.

For error control, LTE uses HARQ, where, after receiving downlink data in a subframe, the mobile terminal attempts to decode it and reports to the base station whether the decoding was successful (ACK) or not (NACK) via a Physical Uplink Control Channel (PUCCH). In the event of an unsuccessful decoding attempt, the base station (eNodeB) can retransmit the erroneous data. Similarly, the base station can indicate to the UE whether the decoding of the PUSCH was successful (ACK) or not (NACK) via the Physical Hybrid ARQ Indicator CHannel (PHICH).

In addition to the hybrid-ARQ ACK/NACK information transmitted from the mobile terminal to the base station, uplink control signaling from the mobile terminal to the base station also includes reports related to the downlink channel conditions, referred to generally as channel-state information (CSI) or channel-quality information (CQI). This CSI/CQI is used by the base station to assist in downlink resource scheduling decisions. Because LTE systems rely on dynamic scheduling of both downlink and uplink resources, uplink control-channel information also includes scheduling requests, which the mobile terminal sends to indicate that it needs uplink traffic-channel resources for uplink data transmissions.

In scenarios without downlink carrier aggregation, when a UE has data to transmit on PUSCH, it multiplexes the uplink control information with data on PUSCH. Thus, a UE only uses PUCCH for signaling this uplink control information when it does not have any data to transmit on PUSCH. Accordingly, if the mobile terminal has not been assigned an uplink resource for data transmission, Layer 1/Layer 2 (L1/L2) control information, including channel-status reports, hybrid-ARQ acknowledgments, and scheduling requests, is transmitted in uplink resources (resource blocks) specifically assigned for uplink L1/L2 control on the Physical Uplink Control CHannel (PUCCH), which was first defined in Release 8 of the 3GPP specifications (LTE Rel-8).

Figure 6:
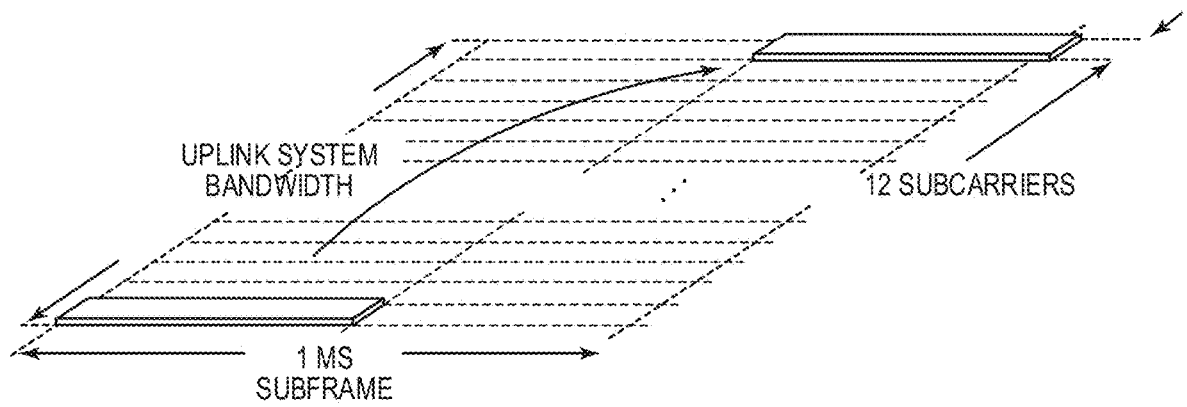
FIG. 6 illustrates the positioning of PUCCH resources in an uplink subframe according to Release 8 standards for LTE.

As illustrated in FIG. 6, these resources are located at the edges of the uplink cell bandwidth that is available to the mobile terminal for use. Each physical control channel resource is made up of a pair of resource blocks, where each resource block in turn consists of twelve OFDM subcarriers, within one of the two slots of the uplink subframe. In legacy LTE systems, in order to provide frequency diversity, the physical control channel resources are frequency hopped on the slot boundary—thus, the first resource block of the pair is at the lower part of the spectrum within the first slot of the subframe while the second resource block of the pair is positioned at the upper part of the spectrum during the second slot of the subframe (or vice-versa). If more resources are needed for the uplink L1/L2 control signaling, such as in case of very large overall transmission bandwidth supporting a large number of users, additional resource blocks can be assigned, adjacent to the previously assigned resource blocks.

The reasons for locating the PUCCH resources at the edges of the overall available spectrum are two-fold. First, together with the frequency hopping described above, this maximizes the frequency diversity experienced by the control signaling, which can be encoded so that it is spread across both resource blocks. Second, assigning uplink resources for the PUCCH at other positions within the spectrum, i.e., not at the edges, would fragment the uplink spectrum, making it difficult to assign very wide transmission bandwidths to a single mobile terminal while still retaining the single-carrier property of the uplink transmission.

When a UE has ACK/NACK to send in response to a downlink PDSCH transmission, it determines which PUCCH resource to use from the PDCCH transmission that assigned the PDSCH resources to the UE. More specifically, an index to the PUCCH resource for the UE is derived from the number of the first control channel element used to transmit the downlink resource assignment. When a UE has a scheduling request or CQI to send, it uses a specific PUCCH resource that has been pre-configured for the UE by higher layer signaling.

Depending on the different types of information that PUCCH is to carry, several different PUCCH formats may be used. The data-carrying capacity of a pair of resource blocks during one subframe is more than is generally needed for the short-term control signaling needs of one mobile terminal. Therefore, to efficiently exploit the resources set aside for control signaling, multiple mobile terminals can share the same physical control channel resource. This is done by assigning each of several mobile terminals different orthogonal phase-rotations of a cell-specific, length-12, frequency-domain sequence and/or different orthogonal time-domain cover codes. By applying these frequency-domain rotations and/or time-domain covering codes to the encoded control channel data, as many as 36 mobile terminals can share a given physical control channel resource, in some circumstances.

Several different encoding formats have been developed by 3GPP to encode different quantities and types of uplink control channel data, within the constraints of a single physical control channel resource. These several formats, known generally as PUCCH Format 1, PUCCH Format 2, and PUCCH Format 3, are described in detail at pages 226-242 of the text "4G LTE/LTE-Advanced for Mobile Broadband," by Erik Dahlman. Stefan Parkvall, and Johan Sköld (Academic Press, Oxford UK, 2011), and are summarized briefly below.

Existing PUCCH Formats

PUCCH resources carry uplink control information (UCI) that includes scheduling requests (SR), hybrid-ARQ acknowledgements and channel state information (CSI reports). There exist 3 different PUCCH formats. PUCCH format 1, 1a and 1b carry SRs and one or two HARQ ACK/NACKs, respectively. Multiplexing of SR with HARQ feedback is also possible. PUCCH format 2 can carry up to 11 bits of information is used for CSI feedback, 2a and 2B may carry additionally one or two HARQ ACK/NACK bits, respectively. PUCCH format 3 was introduced in Release 11 and may carry up to 22 bits and may multiplex all three types of UCI.

PUCCH formats 1 and 2 use orthogonal phase rotations of a length-12 frequency domain sequence as the allocation is fixed to 12 subcarriers. PUCCH format 1 uses in addition orthogonal cover codes. This enables multiplexing multiple users to share uplink resources when same PUCCH format is used. It is also possible to multiplex PUCCH format 1 and 2 but some phase rotation need to be reserved as "guard period".

PUCCH format 3 uses DFT-spread OFDM which is the same as used for UL data transmissions. Thus, with this PUCCH format 3 UL simultaneous transmission of PUCCH and PUSCH are possible as the DFTS-OFDM is a multi-carrier transmission. For the format 3, length-5 orthogonal sequence is used to enable multiplexing up to five users on same resources. Due to different structures, PUCCH format 3 may not be multiplexed with formats 1 and 2.

The structure of PUCCH formats 1, 1a, and 1b, which are used to transmit scheduling requests and/or ACK/NACK, is based on cyclic shifts of a Zadoff-Chu sequence, and can be found in 3GPP TS 36.211, section 5.4.1. One or two bits are transmitted. First the bit(s) are converted to a complex-valued number d(0) according to Table 5.4.1.-1. The resulting modulated data symbol is multiplied with the cyclically Zadoff-Chu shifted sequence, which is a function of angle phi in Table 5.5.2.2-1, and where the cyclic shift is antenna port-specific. The cyclic shift varies from one symbol to another and from one slot to the next. Although twelve different shifts are available, higher-layer signaling may configure UEs in a given cell to use fewer than all of the shifts, to maintain orthogonality between PUCCH transmissions in cells that exhibit high frequency selectivity. After the modulated data symbol is multiplied with the Zadoff-Chu sequence, the result, which corresponds to a SC-FDMA symbol of 12 subcarriers is spread, using an orthogonal spreading sequence. PUCCH formats 1, 1a, and 1b carry three reference symbols per slot (when normal cyclic prefix is used), at SC-FDMA symbol numbers 2, 3, and 4. This leaves four SC-FDMA symbols for information transmission (three in the case of extended cyclic prefix). The SC-FDMA symbol of 12 subcarriers is thus spread over these four SC-FDMA symbols using orthogonal spreading codes from Table 5.4.1.-2. This set is then mapped onto both slots.

TABLE 5.4.1-1

Modulation symbol d(0) for PUCCH formats 1a and 1b

| PUCCH format | b(0), . . . , b($M_{bit}$ − 1) | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

TABLE 5.5.1.2-1

Definition of φ(n) for $M_{sc}^{RS} = N_{sc}^{RB}$.

| u | φ(0), . . . , φ(11) |
| --- | --- |
| 0 | −1 1 3 −3 3 3 1 1 3 1 −3 3 |
| 1 | 1 1 3 3 3 −1 1 −3 −3 1 −3 3 |
| 2 | 1 1 −3 −3 −3 −1 −3 −3 1 −3 1 −1 |
| 3 | −1 1 1 1 1 −1 −3 −3 1 −3 3 −1 |
| 4 | −1 3 1 −1 1 −3 −1 −1 1 −1 1 3 |
| 5 | 1 −3 3 −1 −1 1 1 −1 −1 3 −3 1 |
| 6 | −1 3 −3 −3 −3 3 1 −1 3 3 −3 1 |
| 7 | −3 −1 −1 −1 1 −3 3 −1 1 −3 3 1 |
| 8 | 1 −3 3 1 −1 −1 −1 1 1 3 −1 1 |

TABLE 5.5.1.2-1-continued

Definition of φ(n) for $M_{sc}^{RS} = N_{sc}^{RB}$.

| u | φ(0), . . . , φ(11) |
| --- | --- |
| 9 | 1 −3 −1 3 3 −1 −3 1 1 1 1 1 |
| 10 | −1 3 −1 1 1 −3 −3 −1 −3 −3 3 −1 |
| 11 | 3 1 −1 −1 3 3 −3 1 3 1 3 3 |
| 12 | 1 −3 1 1 −3 1 1 1 −3 −3 −3 1 |
| 13 | 3 3 −3 3 −3 1 1 3 −1 −3 3 3 |
| 14 | −3 1 −1 −3 −1 3 1 3 3 3 −1 1 |
| 15 | 3 −1 1 −3 −1 −1 1 1 3 1 −1 −3 |
| 16 | 1 3 1 −1 1 3 3 3 −1 −1 3 −1 |
| 17 | −3 1 1 3 −3 3 −3 −3 3 1 3 −1 |
| 18 | −3 3 1 1 −3 1 −3 −3 −1 −1 1 −3 |
| 19 | −1 3 1 3 1 −1 −1 3 −3 −1 −3 −1 |
| 20 | −1 −3 1 1 1 1 3 1 −1 1 −3 −1 |
| 21 | −1 3 −1 1 −3 −3 −3 −3 −3 1 −1 −3 |
| 22 | 1 1 −3 −3 −3 −3 −1 3 −3 1 −3 3 |
| 23 | 1 1 −1 −3 −1 −3 1 −1 1 3 −1 1 |
| 24 | 1 1 3 1 3 3 −1 1 −1 −3 −3 1 |
| 25 | 1 −3 3 3 1 3 3 1 −3 −1 −1 3 |
| 26 | 1 3 −3 −3 3 −3 1 −1 −1 3 −1 −3 |
| 27 | −3 −1 −3 −1 −3 3 1 −1 1 3 −3 −3 |
| 28 | −1 3 −3 3 −1 3 3 −3 3 3 −1 −1 |
| 29 | 3 −3 −3 −1 −1 −3 −1 3 −3 3 1 −1 |

TABLE 5.4.1-2

Orthogonal sequences [w(0) . . . w($N_{SF}^{PUCCH}$ − 1)] for $N_{SF}^{PUCCH}$ = 4

| Sequence index $n_{oc}^{(p)}(n_s)$ | Orthogonal sequences [w(0) . . . w($N_{SF}^{PUCCH}$ − 1)] |
| --- | --- |
| 0 | [+1 +1 +1 +1] |
| 1 | [+1 −1 +1 −1] |
| 2 | [+1 −1 −1 +1] |

PUCCH Formats 1a and 1b refer to PUCCH transmissions that carry either one or two hybrid-ARQ acknowledgements, respectively. A PUCCH Format 1 transmission (carrying only a SR) is transmitted on a UE-specific physical control channel resource (defined by a particular time-frequency resource, a cyclic-shift, and an orthogonal spreading code) that has been pre-configured by RRC signaling. Likewise, PUCCH Format 1a or 1b transmissions carrying only hybrid-ARQ acknowledgements are transmitted on a different UE-specific physical control channel resource. PUCCH Format 1a or 1b transmissions that are intended to carry both ACK/NACK information and a scheduling request are transmitted on the assigned SR resource for positive SR transmission, and are encoded with the ACK/NACK information.

Figure 7:
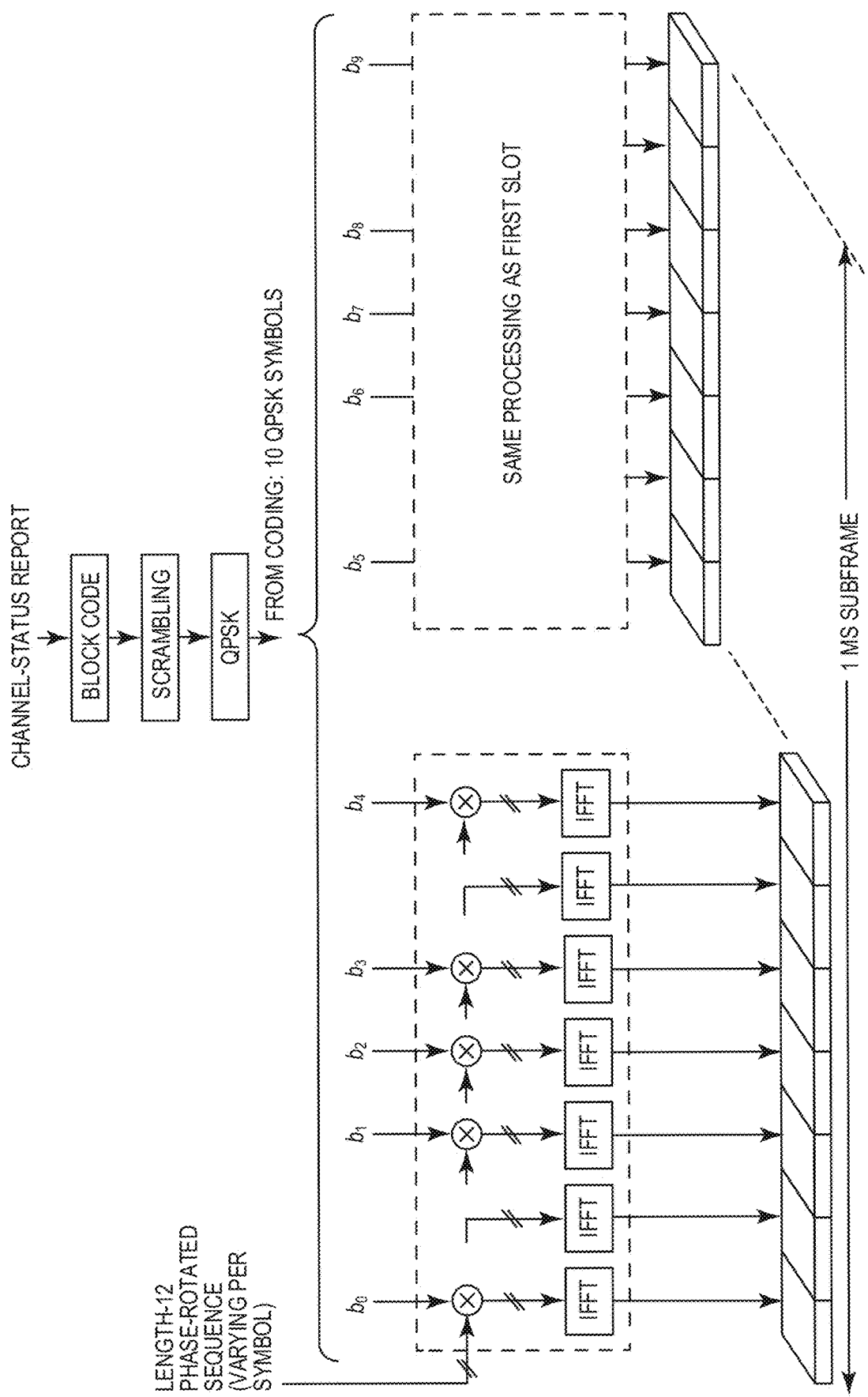
FIG. 7 illustrates the encoding and modulation of channel-status information according to PUCCH Format 2.

PUCCH Format 1/1a/1b transmissions carry only one or two bits of information (plus scheduling requests, depending on the physical control channel resource used for the transmission). Because channel-state information reports require more than two bits of data per subframe, PUCCH Format 2/2a/2b, as defined in section 5.4.2 of 3GPP TS 36.211, is used for these transmissions. As illustrated in FIG. 7, in PUCCH formats 2, 2a, and 2b, up to 11 bits of CSI bits are first block-coded to 20 bits, using the code in Table 5.2.3.3-1, and then the block-coded bits for transmission are scrambled and QPSK modulated, according to Table 7.1.2.-1. (FIG. 7 illustrates coding for a subframe using a normal cyclic prefix, with seven symbols per slot. Slots using extended cyclic prefix have only one reference-signal symbol per slot, instead of two.) The resulting ten QPSK symbols d(0), . . . , d(9) are then multiplied with a cyclically shifted Zadoff-Chu type sequence, again using the set of angle phis from Table 5.5.1.2-1, where again the cyclic shift varies between symbols and slots. One slot of PUCCH Format 2 resources has reference symbols on two symbols, leaving five symbols per slot for information. Five of the symbols are processed and transmitted in the first slot, i.e., the slot appearing on the left-hand side of FIG. 7, while the remaining five symbols are transmitted in the second slot. PUCCH formats 2, 2a, and 2b carry two reference symbols per slot, located on SC-FDMA symbol numbers 1 and 5.

Formats 2a and 2b carry in addition one or two HARQ ACK/NACK bits, respectively. The bit(s) are converted to a complex number d(10) using the mapping described in Table 5.4.1.1, where 1a→2a and 1b→2b. The information in d(10) is carried such that the complex number is used in the generation of the DMRS sequence of the PUCCH.

PUCCH Format 2 transmissions from several UEs, with the separate transmissions separated by the cyclic shifting. As with PUCCH Format 1, each unique PUCCH Format 2 resource can be represented by an index from which the phase rotation and other quantities necessary are derived. The PUCCH format 2 resources are semi-statically configured. It should be noted that a pair of resource blocks can either be configured to support a mix of PUCCH formats 2/2a/2b and 1/1a/1b, or to support formats 2/2a/2b exclusively.

3GPP's Release 10 of the LTE standards (LTE Release 10) has been published and provides support for bandwidths larger than 20 MHz, through the use of carrier aggregation. One important requirement placed on the development of

TABLE 5.2.3.3-1

Basis sequences for (20, A) code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

TABLE 7.1.2-1

QPSK modulation mapping

| b(i), b(i + 1) | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

For UEs operating in accordance with LTE Release 8 or LTE Release 9 (i.e., without carrier aggregation), it is possible to configure the UE in a mode where it reports ACK/NACK bits and CSI bits simultaneously. If the UE is using normal cyclic prefix, one or two ACK/NACK bits are modulated onto a QPSK symbol, using the mapping described in Table 5.4.1.1, where 1a→2a and 1b→2b, which is mapped onto the second reference signal (RS) resource element in each slot of the PUCCH format 2. If one ACK/NACK bit is modulated on the second RS in each slot, the PUCCH format used by the UE is referred to as PUCCH Format 2a. If two ACK/NACK bits are modulated on the second RS in each slot the PUCCH format used by the UE is referred to as PUCCH Format 2b. If the UE is configured with extended cyclic prefix, one or two ACK/NACK bits are jointly coded with CSI feedback and transmitted together within PUCCH format 2.

As with PUCCH Format 1 transmissions, a pair of resource blocks allocated to PUCCH can carry multiple LTE Release 10 specifications was to assure backwards compatibility with LTE Release 8. The need for spectrum compatibility dictated that an LTE Release 10 carrier that is wider than 20 MHz should appear as a number of distinct, smaller bandwidth, LTE carriers to an LTE Release 8 mobile terminal. Each of these distinct carriers can be referred to as a component carrier.

For early LTE Release 10 system deployments in particular, it can be expected that there will be a relatively small number of LTE Release 10-capable mobile terminals, compared to many "legacy" mobile terminals that conform to earlier releases of the LTE specifications. Therefore, it is necessary to ensure the efficient use of wide carriers for legacy mobile terminals as well as Release 10 mobile terminals, i.e., that it is possible to implement carriers where legacy mobile terminals can be scheduled in all parts of the wideband LTE Release 10 carrier.

One straightforward way to obtain this is by means of a technique called carrier aggregation. With carrier aggregation, an LTE Release 10 mobile terminal can receive multiple component carriers, where each component carrier has (or at least may have) the same structure as a Release 8 carrier. Release 10 of the LTE standards specifies support of up to five aggregated carriers, where each carrier is limited to one of six radio-frequency (RF) bandwidths, namely 1.4, 3, 5, 10, 15, and 20 MHz.

The number of aggregated component carriers as well as the bandwidth for each individual component carrier may be different for uplink and downlink. In a symmetric configuration, the number of component carriers in downlink and uplink is the same, whereas the numbers of uplink and downlink carriers differ in an asymmetric configuration.

During initial access, an LTE Release 10 mobile terminal behaves similarly to an LTE Release 8 mobile terminal, requesting and obtaining access to a single carrier for the uplink and downlink. Upon successful connection to the network a mobile terminal may—depending on its own capabilities and the network—be configured with additional component carriers in the uplink and downlink.

Even if a mobile terminal is configured with additional component carriers, it need not necessarily monitor all of them, all of the time. This is because LTE Release 10 supports activation of component carriers, as distinct from configuration. The mobile terminal monitors for PDCCH and PDSCH only component carriers that are both configured and activated. Since activation is based on Medium Access Control (MAC) control elements—which are faster than radio resource control (RRC) signaling—the activation/de-activation process can dynamically follow the number of component carriers that is required to fulfill the current data rate needs. All but one component carrier—the downlink Primary component carrier (downlink PCC)—can be deactivated at any given time.

When carrier aggregation is used in LTE, one uplink carrier is designed to carry the HARQ-ACK/NACK bits for all downlink-carrier PDSCH transmissions. To enable the possibility to transmit more than four bits of A/N. PUCCH Format 3, which is defined in section 5.4.2A of 3GPP TS 36.211, can be used. In frequency-division duplex (FDD) scenarios, each downlink carrier can generate one or two HARQ ACK/NACK bits per scheduled subframe, depending on whether multiple-input multiple-output (MIMO) operation is enabled for that carrier. In time-division duplex (TDD) scenarios, the number of HARQ ACK/NACK bits also depends on how many downlink subframes a given uplink subframe should carry HARQ ACK/NACK bits for.

PUCCH Format 3, which is designed for scenarios when more than four bits of information must be transmitted, is based on DFT-spread OFDM. PUCCH Format 3 carries 48 channel coded bits, which are first QPSK modulated after scrambling using Table 7.1.2.1-1. The channel coded bits are formed from the (32, O) code given in Table 5.2.2.6.4-1 by a circular repetition of the codewords. There are now 12 QPSK symbols per slot to be transmitted. The 12 QPSK symbols are input to DFT-precoder which outputs one OFDM symbols. There are five OFDM symbols available in a slot as two OFDM symbols are used for DMRS (normal cyclic prefix). Thus, the one OFDM symbol may be spread over five OFDM symbols using orthogonal sequence from Table 5.4.2A-1. In addition to the orthogonal spreading, also a cyclic shift is applied to randomize interference between cells. In second slot, length four orthogonal sequence may be applied in case the last OFDM symbol is used for sounding reference signal. Note that when more than 11 ACK/NACK bits are encoded, the bits are split in two parts, separately encoded into 32-bit codewords which are then truncated to 24 bits and multiplexed together to form a 48-bit codeword.

Figure 8:
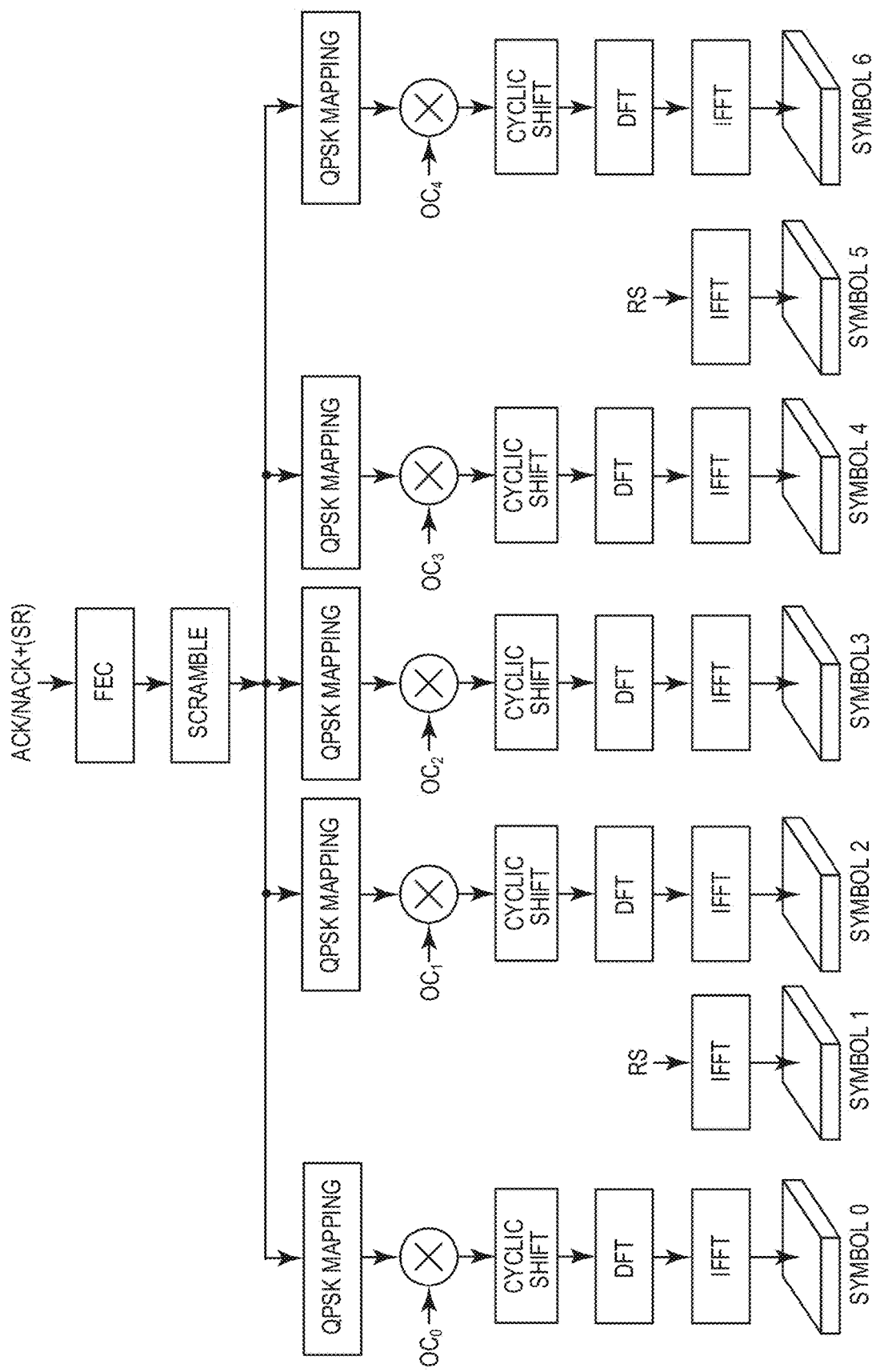
FIG. 8 illustrates the encoding and modulation of multiple ACK/NACK bits according to PUCCH Format 3.

FIG. 8 shows a block diagram of that design, for one of the two slots of an LTE subframe. The same processing is applied to the second slot of the uplink frame. In the illustrated scenario, multiple ACK/NACK bits (which may be combined with a single SR bit) are encoded, using a Reed-Muller (RM) forward-error correction (FEC) code, to form 48 coded bits. (Some of the 32 output-coded bits produced by the RM encoder are repeated to produce the 48 coded bits.) The coded bits are then scrambled, using cell-specific (and possibly DFT-spread OFDM symbol dependent) sequences, 24 bits are transmitted within the first slot and the other 24 bits are transmitted within the second slot. The 24 bits per slot are then mapped into 12 QPSK symbols, as indicated by the blocks labeled "QPSK mapping" in FIG. 8, which appear in five of the OFDM symbols of the slot (symbols 0, 2, 3, 4, and 6). The sequence of symbols in each of these five symbols in the slot is spread with OFDM-symbol-specific orthogonal cover codes, indicated by OC0, OC1, OC2, OC3, and OC4 in FIG. 8, and cyclically shifted, prior to DFT-precoding. The DFT-precoded symbols are converted to OFDM symbols (using an Inverse Fast-Fourier Transform, or IFFT) and transmitted within one resource block (the bandwidth resource) and five DFT-spread OFDM symbols (the time resource). The spreading sequence or orthogonal cover code (OC) is UE-specific and enables multiplexing of up to five users within the same resource blocks.

TABLE 5.2.2.6.4-1

Basis sequences for (32, O) code.

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |

TABLE 5.2.2.6.4-1-continued

Basis sequences for (32, O) code.

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

TABLE 5.42A-1

The orthogonal sequence $w_{n_{oc}}(i)$

| Sequence index $n_{oc}$ | Orthogonal sequence $[w_{n_{oc}}(0) \ldots w_{n_{oc}}(N_{SF}^{PUCCH}-1)]$ | |
|---|---|---|
| | $N_{SF}^{PUCCH}=5$ | $N_{SF}^{PUCCH}=4$ |
| 0 | [1 1 1 1 1] | [+1 +1 +1 +1] |
| 1 | [1 $e^{j2\pi/5}$ $e^{j4\pi/5}$ $e^{j6\pi/5}$ $e^{j8\pi/5}$] | [+1 −1 +1 −1] |
| 2 | [1 $e^{j4\pi/5}$ $e^{j8\pi/5}$ $e^{j2\pi/5}$ $e^{j6\pi/5}$] | [+1 +1 −1 −1] |
| 3 | [1 $e^{j6\pi/5}$ $e^{j2\pi/5}$ $e^{j8\pi/5}$ $e^{j4\pi/5}$] | [+1 −1 −1 +1] |
| 4 | [1 $e^{j8\pi/5}$ $e^{j6\pi/5}$ $e^{j4\pi/5}$ $e^{j2\pi/5}$] | — |

For the reference signals (RS), cyclic-shifted constant-amplitude zero-autocorrelation (CAZAC) sequences can be used. For example, the computer optimized sequences in 3GPP TS 36.211, "Physical Channels and Modulation," can be used. To improve orthogonality among reference signals even further, an orthogonal cover code of length two could be applied to the reference signals. However, this approach is not used in Releases 10 or 11 of the LTE specifications.

If the number of ACK/NACK bits exceeds eleven, then the bits are split into two parts and two RM encoders are used, one for each of the two parts. This is known as the dual-RM code. Up to twenty ACK/NACK bits (plus one SR bit) can be supported by PUCCH Format 3 in this manner. Each encoder in the dual-RM code outputs twenty-four bits which are converted to twelve QPSK symbols, and the resulting two sets of twelve QPSK symbols are distributed across the slots and interleaved over the subcarriers so that the twelve symbols from the first encoder are mapped to odd subcarriers and the twelve symbols from the second encoder are mapped to even subcarriers, where six odd and six even sub-carriers are assumed per slot. (In this mapping operation, a cell-, slot-, and symbol-specific cyclic shift of the symbols in the time domain is included, to provide inter-cell interference randomization.) The twelve QPSK symbols per slot are then spread across the five DFTS-OFDM symbols, using one out of five orthogonal cover codes, as in the single-RM code case.

Figure 9:
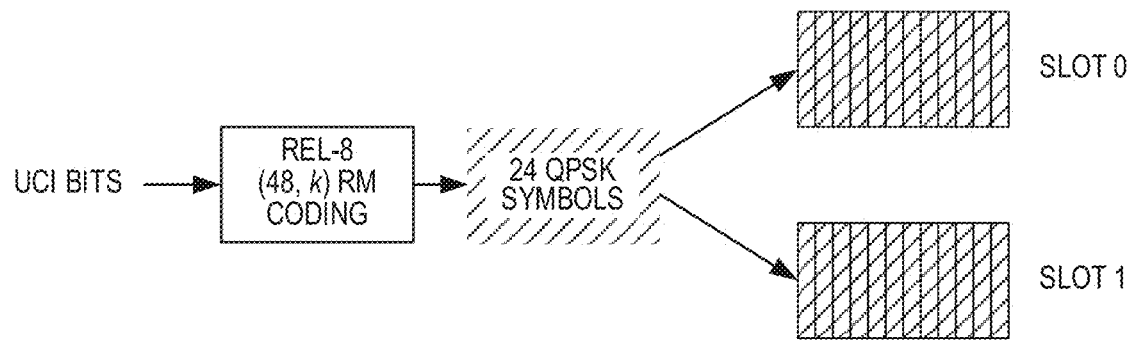
FIG. 9 illustrates PUCCH Format 3 encoding and multiplexing for up to 11 bits.
Figure 10:
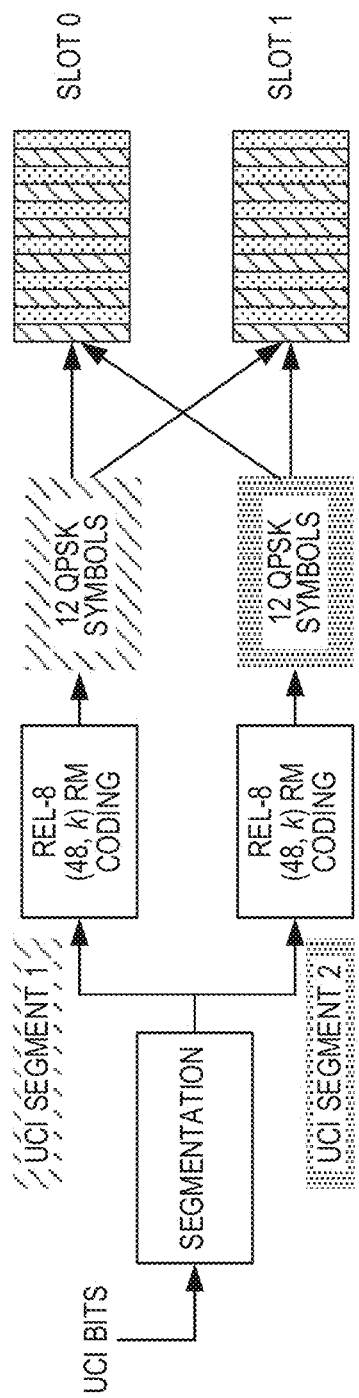
FIG. 10 illustrates PUCCH Format 3 encoding and multiplexing for 12-21 bits.

Some details of the encoding and multiplexing approach described above are shown in FIGS. 9 and 10. FIG. 9 illustrates the approach for up to eleven uplink control information (UCI) bits. As described above, in this case the UCI bits are encoded to produce 48 bits, using a single encoder. These 48 bits are mapped to 24 QPSK symbols, which are divided between the first and second slots of the uplink subframe carrying the PUCCH. FIG. 10, on the other hand, illustrates the approach taken for 12 to 21 UCI bits. In this case, the UCI bits are split into two segments, which are supplied to two separate encoders. Each encoder produces 24 encoded bits, which are mapped into twelve QPSK symbols. The 12 QPSK symbols from each encoder are distributed, on an interleaved basis, between the two slots of the uplink subframe.

The operation of the multiplexing scheme illustrated in FIG. 9 is described by the following algorithm, in which $\breve{b}_0, \breve{b}_1, \breve{b}_2, \ldots, \breve{b}_3$ is the output sequence from the first encoder and $\widetilde{b}_0, \widetilde{b}_1, \widetilde{b}_2, \ldots, \widetilde{b}_{23}$ the output sequence from the second encoder. $N_{sc}^{RB}=12$ is the number of subcarriers per resource block. The output bit sequence $b_0, b_1, b_2, \ldots, b_{B-1}$, where $B=4 \cdot N_{sc}^{RB}$, is obtained by the alternate concatenation of the bit sequences $\breve{b}_0, \breve{b}_1, \breve{b}_2, \ldots, \breve{b}_{23}$ and $\widetilde{b}_0, \widetilde{b}_1, \widetilde{b}_2, \ldots, \widetilde{b}_{23}$ as shown in the following pseudo-code:

Set i,j=0
while i<4·$N_{sc}^{RB}$ $b_i = \breve{b}_j, b_{i+1} = \widetilde{b}_{j+1}$ $b_{i+2} = \widetilde{b}_j, b_{i+3} = \widetilde{b}_{j+1}$ $i = i+4$ $j = j+2$ end while.

Resource Sharing

Figure 11:
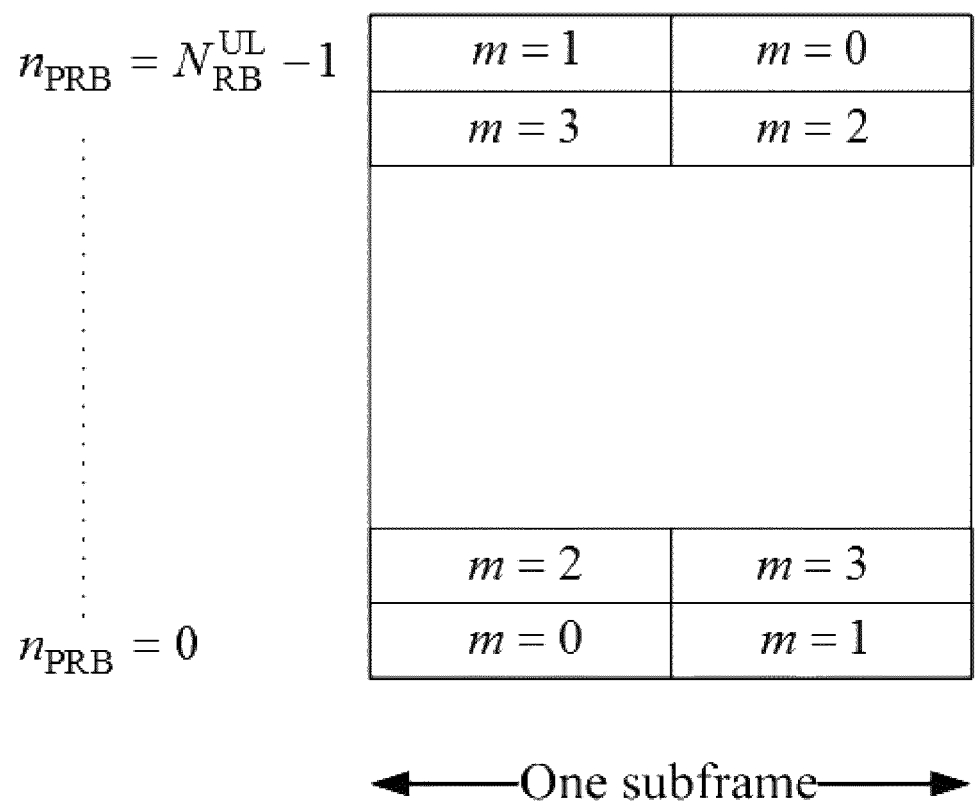
FIG. 11 illustrates the PUCCH regions according to the current LTE standards.

The current PUCCH region is depicted in FIG. 11. PUCCH resources are mapped such that PUCCH format 2 occupies resources closest to the edge and format 1 is next to format 2. There may be defined a resource set where format 1 and 2 may be multiplexed. Format 3 is may be configured between format 1 and 2 or closest to the PUSCH/UL-SCH area.

The exact resource used for a particular UL subframe is determined by a variable m (in FIG. 11), as defined in 3GPP TS 36.211, section 5.4.3:

The physical resource blocks to be used for transmission of PUCCH in slot $n_s$ are given by $$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases} \quad \text{Equation (1)}$$

where the variable m depends on the PUCCH format.
(N_RB^UL is number of RBs in UL, depends on BW)
The variable in is a function of higher layer configured or fixed parameters and a resource index. The resource index is also different for each format and is derived differently depending on for example how the DL assignment has been given [3GPP TS 36.213, section 10.1.2]. For example, if DL downlink control information (DCI) was given via PDCCH, for format 1, the resource index is a sum of the lowest CCE index used to construct the PDCCH and a higher layer configured parameter. This resource index also determines which of the multiplexing sequences are used for each format. Thus the uplink scheduling is dynamically controlled through the resource indexes within the higher layer configured resources.

Figure 12:
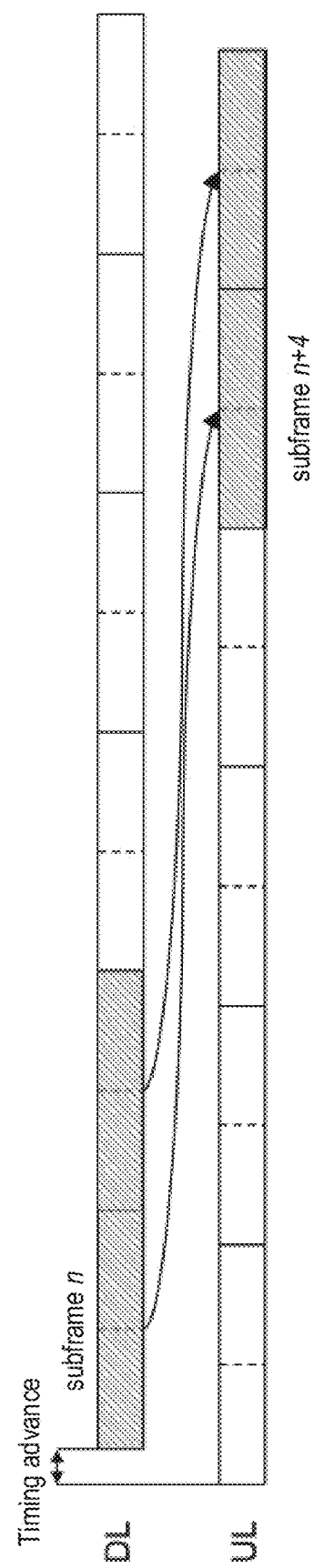
FIG. 12 illustrates the timing of ACK/NACK feedback in legacy systems.

In legacy LTE systems, i.e., those LTE systems operating according to Release 11 or earlier of the 3GPP specifications, DL scheduling is done on a 1-millisecond subframe basis. The scheduling messages are sent each subframe, and the granted resource occupies all of the OFDM symbols allocated to the PDSCH in the resource block pairs allocated to the UE in the resource grant. The processing time allowed to the terminal for completing all processing related to a transmission in a given subframe is 3 milliseconds, less the timing advance. The specifications for LTE thus specify that the ACK/NACK in response to a PDSCH transmission in subframe n should be transmitted in the UL in subframe n+4, no matter the size of the transport block or when the assignment ends. This is illustrated in FIG. 12.

In a system in which sub-subframe assignments are possible, this rigid approach is wasteful, since the processing time required for the terminal depends on the duration of the PDSCH assignment, as well as the size of the transport block. This means that when a UE detects that the assignment is scheduled only on a consecutive subset of the OFDM symbols in a subframe, referred to as a "sub-subframe", it is in principle able to transmit the ACK/NACK feedback earlier than what would be possible for the case when all symbols in the subframe are used.

The techniques detailed below are based on an assumption that an LTE terminal can receive PDSCH resource assignments on all or on only a subset of OFDM symbols within a 1-millisecond subframe and that the resource assignments can vary from one subframe to another. More generally, it will be appreciated that the techniques may be applied to communications between one wireless device and another, where transmissions of data from a first wireless device to a second wireless device in a given subframe can occupy a duration that is less than a maximum data transmission duration that is possible within the subframe, where the term "subframe" may be understood to refer to a default transmission-time interval (TTI) in a given wireless system.

There are three problems related to the concept of short downlink subframes. The first problem relates to latency reduction, and the second relates to multiplexing of UL resources for SSF and legacy users. The third problem is related to the use case of the sub-subframe (SSF) concept where the UL feedback channel allocation is longer than DL sub-subframe, such that one UL resource should carry ACK/NACK for multiple DL SSFs. That is a form of ACK/NACK bundling.

Latency Reductions

As can be seen in FIG. 11, a PUCCH of one user m=0, . . . , 3, occupies the whole 1-millisecond subframe. Introducing the concept of sub sub-frames (SSF) in the PDSCH enables HARQ ACK/NACK to be sent 1-2 milliseconds earlier if processing time reductions are assumed. However, to further reduce the HARQ ACK/NACK feedback time enabled by introducing SSF, the uplink should be shortened as well.

UL Multiplexing

Figure 13:
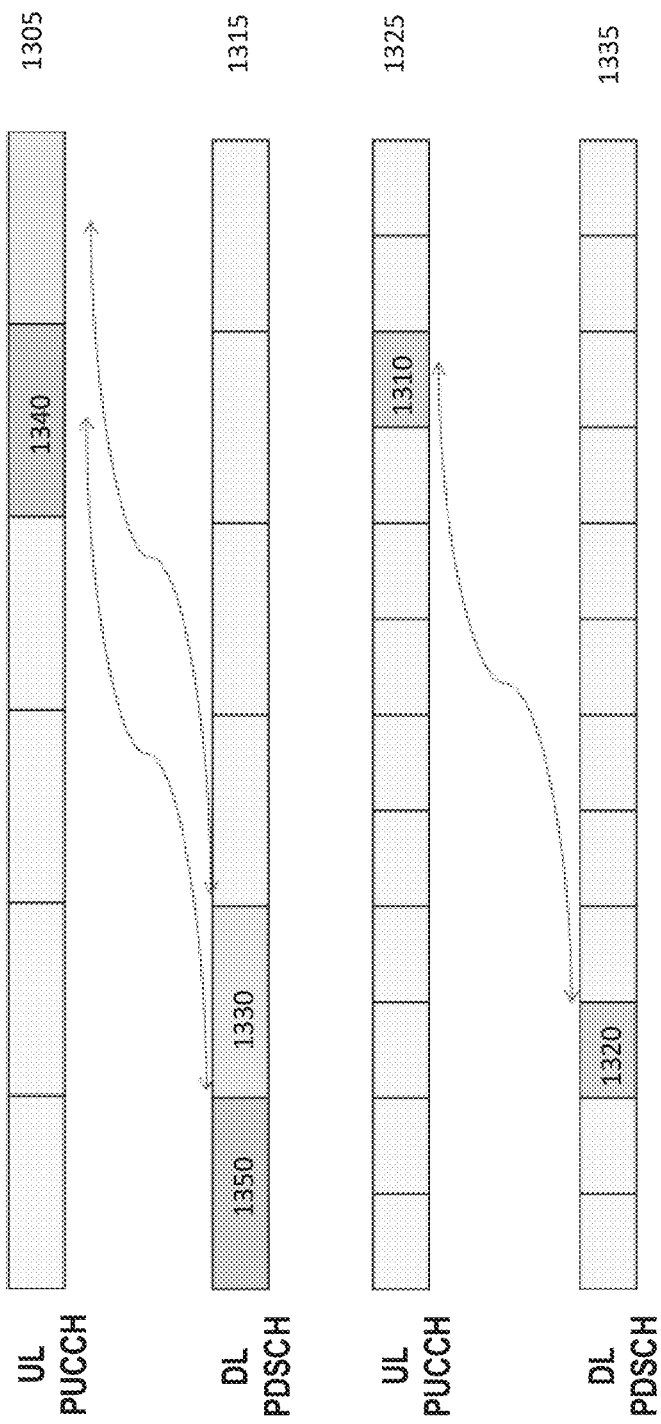
FIG. 13 illustrates the timing of ACK/NACK feedback in an example implementation that uses slot-based downlink and slot-based uplink.

The problem for resource allocations can be seen as follows. In FIG. 13, the upper bars 1305 and 1315 show the UL/DL pair of downlink PDSCH and corresponding uplink PUCCH for normal 1-millisecond subframe, while the lower bars 1325 and 1335 show the UL/DL pair for 0.5-millisecond sub-subframes. If the same processing time is assumed, the sub-subframe PUCCH 1310 containing ACK of a DL sub-subframe 1320 that starts at the same time as normal DL subframe 1330 would collide with PUCCH 1340, which contains ACK for the earlier normal subframe 1350. If processing time reduction is assumed (to 1.5 milliseconds, for example), the sub-subframe PUCCH containing ACK/NACK would collide with an even earlier 1-millisecond uplink subframe.

The 3GPP specification 3GPP TS 36.211 provides a rather complicated set of rules enables dynamic scheduling of UL PUCCH resources within an UL subframe n by controlling the DL scheduling of DL subframe n-4. Thus, the UL multiplexing (assuming it is possible), of SSF ACK/NACK and legacy UCI might bring in some scheduling complications or even restrictions.

ACK/NACK Bundling

A third problem is related to the use case where the UL feedback channel allocation is longer than DL sub-subframe, such that one UL resource needs to carry ACK/NACK for multiple DL SSFs. Similar situations may occur if a new RAT is introduced in one direction and combined with LTE in the other direction. For instance, a new radio-access technology in the downlink combined with legacy LTE in the uplink. Such a deployment would give a downlink performance boost with better uplink coverage than with same length UL and DL sub-subframes.

Accordingly, to acknowledge the sub-subframe DL transmissions in such a way that the latency benefits possible with SSF downlink transmissions are fully enabled, the uplink resource allocation and the UL control channels need modifications. In short, the PUCCH needs to occupy less than the 1 ms UL subframe. Thus, resource allocations and possible multiplexing, in addition to shorted UL PUCCH formats, are discussed. This solves the issue of acknowledging downlink transmissions that use the sPDSCH while keeping backwards compatibility with the current PUCCH structure in LTE. Taken together or separately, the techniques described herein may be used in such a way that both legacy UEs and new UEs use PUCCH in the same way in a system that allows simultaneous use of sub frames with 1-millisecond timing and SSFs with, e.g., 0.5-millisecond timing. This simplifies the UE design and the network design.

The short PUCCH, or "sPUCCH" described herein may have a signal form similar to the legacy PUCCH formats 1, 2, which are single-carrier based, or format 3, which is DFTS-OFDM based. The key difference between the single carrier (SC) and multicarrier (MC) based sPUCCH solutions is that non-consecutive frequency domain allocations are possible only with the MC sPUCCH solution.

For both-single carrier and multicarrier sPUCCH solutions, the simplest solution, which can also be called the minimum impact solution, is a slot based UL. FIG. 14 shows an example of the minimum impact slot based sPUCCH for both SC and MC based sPUCCH formats. Users m=0 and m=1 represent users with legacy PUCCH formats and for this example we assume separate frequency resources for legacy and new sPUCCH for simplicity. With the SC format on the left side of the figure, one user may occupy only one slot from one frequency allocation at a time. In the figure, users with index m=2, 3, 4 and 5 occupy one slot each.

For the MC based format on right side of the figure, one user may occupy a slot simultaneously from two sides of the spectrum. Here users m=2 and m=3 occupy two slots. It should be noted that it is not necessary to occupy non-consecutive frequency allocations with the MC-format. However, it is possible, and thus the feature allows more flexible design of the sPUCCH.

Both SC and MC based solutions may be generalized to an uplink allocation that may be any number of symbols from 1 to 14.

Resource Allocations

Depending on the exact design of the sPUCCH, length and cover code design, multiplexing with legacy PUCCH may be possible. For example, a slot-based SC sPUCCH may be multiplexed with legacy PUCCH format 1 or 2, and slot-based MC sPUCCH may be multiplexed with legacy PUCCH format 3.

In some cases, the multiplexing with legacy PUCCH formats is not preferred. For example, if the number of legacy users is high, it might be more efficient to multiplex only legacy users together as the length of the UL transmissions are the same. For this case, one possibility is to define a new sPUCCH region next to the existing PUCCH region in the frequency domain such that SSF-enabled UEs would be scheduled in that narrow frequency region. Within this region, different time and frequency domain multiplexing options are possible In some embodiments of the techniques and apparatus described herein, the uplink allocation, that is sPUCCH, may be any number of symbols from 1 to 14. Different time and frequency multiplexing options with frequency hopping may be used. The signal format for the sPUCCH may be single carrier type similar to legacy sPUCCH format1/2 or DFTS-OFDM like legacy PUCCH format 3.

Single Carrier sPUCCH (Format 1&2)

Slot Based—

A minimum impact UL would be a slot based UL where the existing PUCCH format 1 or 2 is used but only in one of the slots, i.e., skipping the frequency hopping aspect within a subframe. The left hand side of FIG. 14 depicts the case where users m=0 and 1 are legacy users and users m=2, . . . , 5 are SSF users with simple slot base UL. The benefit of this approach is that especially for format 1, the current structure can be used directly, thus a scheduling request (SR) or one to two HARQ ACK/NACK bits may be carried.

For format 2, a new channel code is needed that maps information bits into 10 channel coded bits instead of 20. One such code can be formed by puncturing a sub code of the block code (20, A), given in Table 5.2.3.3-1. By taking the base sequences {Mi,0, Mi,1, Mi,2, Mi,3, Mi,4} for i=0, . . . , 9, we obtain a (10, 5) code with minimum distance 4. The resulting code is presented in Table 1. Then the same procedure for one slot may be used. That is, 5 CSI bits may be carried in addition to one to two HARQ ACK/NACK bits with the format 2 like slot base sPUCCH. These 5 bits may be also HARQ ACK/NACK bits.

Multiplexing with slot length UL and legacy format 1 and 2 should be possible by applying the existing Equation (1) and by mapping the slot number n_s to a corresponding downlink slot.

TABLE 1

Basis sequences for(10, 5) code obtained by puncturing a sub-code of (20, A) code.

| i | Mi, 0 | Mi, 1 | Mi, 2 | Mi, 3 | Mi, 4 |
|---|---|---|---|---|---|
| 0 | 1 | 1 | 0 | 0 | 0 |
| 1 | 1 | 1 | 1 | 0 | 0 |
| 2 | 1 | 0 | 0 | 1 | 0 |
| 3 | 1 | 0 | 1 | 1 | 0 |
| 4 | 1 | 1 | 1 | 1 | 0 |
| 5 | 1 | 1 | 0 | 0 | 1 |
| 6 | 1 | 0 | 1 | 0 | 1 |
| 7 | 1 | 0 | 0 | 1 | 1 |
| 8 | 1 | 1 | 0 | 1 | 1 |
| 9 | 1 | 0 | 1 | 1 | 1 |

1-7 SC-FDMA Symbols—

A generalization of this case is to use 1-7 SC-FDMA symbol-length sPUCCH. Similar to the HARQ ACK/NACK indication for format 2a and 2b, the ACK/NACK indication could be carried in a phase shift of the DMRS sequence. Thus a simple 1-2 OFDM symbol length sPUCCH could consist of only one or two DMRS sequences.

In general, per SC-FDMA symbol, the length 12 sequence of Table 5.5.1.2.-1 gives multiplexing opportunities between the single carrier sPUCCH SC-FDMA symbol and an SC-FDMA symbol of legacy PUCCH of format 1 or 2. When format 2 is used for the 2-7 SC-FDMA symbol length sPUCCH, the constraining issue is the channel coding. Two channel coded bits (one complex symbol) can be sent within one SC-FDMA symbol of the sPUCCH.

Further, using similar structure as format 1a and 1b, any length between 2-7 is possible assuming one to two symbols are for the DMRS sequence. In this format, one complex symbols is first spread over 12 subcarriers using Table 5.5.1.2.-1 and then possibly spread over multiple SC-FDMA symbols. The number of SC-FDMA symbols define the robustness as a result of the length of the orthogonal cover code.

Multiplexing for SC sPUCCH—

The length of the cover code also defines the multiplexing capacity. For example, if there are two SC-FDMA symbols not carrying DMRS, the cover codes are for example [1 1] and [1 −1]. This means that two sPUCCH users using same length 12 cover codes may be multiplexed using the mentioned cover codes on the two SC-FDMA symbols. Multiplexing with a legacy user that has cover code [1 1 1 1] is possible such that one sPUCCH user is multiplexed on the first two SC-FDMA symbols and second user is multiplexed with the last two OFDM users. Both sPUCCH users use cover code [1 −1] and have one symbol for DMRS. Table 2 depicts this example. Note that same amount of information is carried with legacy PUCCH format 1 and this SC sPUCCH but the transmission of the legacy PUCCH is more robust.

TABLE 2

Example of multiplexing legacy PUCCH format 1 user with two SC-sPUCCH users

| User 1 | Legacy PUCCH format 1 | [1 1 DMRS DMRS DMRS 1 1] |
|---|---|---|
| User 2 | SC sPUCCH | [1 −1 DMRS] |
| User 3 | SC sPUCCH | [DMRS 1 −1] |

Frequency Diversity for SC sPUCCH—

For SC sPUCCH, frequency domain diversity is possible by designing a slot length sPUCCH that consists of two parts, [1 −1 DMRS] and [DMRS 1 −1], and where the first part is sent over first three SC-FDMA symbols (symbols 0-2) on one end of the spectrum and the latter part is sent over last three SC-FDMA symbols of the slot (symbols 4-6). FIG. 15 shows this example of frequency diversity. Note that for simplicity, multiplexing is not shown in this figure and legacy PUCCH is depicted on adjacent frequency resource. In general, the split can be one symbol length and the hopping may happen in multiple frequency allocation. The only restriction is to have channel estimation per used frequency allocation enabled by DMRS or equivalent.

Multicarrier Type sPUCCH (Format 3)

Slot Based—

DFTS-OFDM maybe a valid option for sPUCCH for two reasons. One is to enable simultaneous transmission with UL data (PUSCH) and other is to enable simultaneous transmission on non-contiguous frequency allocations as was depicted in FIG. 14. Again, the minimum impact solution is to use slot based UL. For format 3, 24 channel coded bits may be carried using existing formulation of format 3. Further, up to 5 users may be multiplexed per slot using cover codes in Table 5.4.2A-1.

1-7 OFDM Symbols—

A modified version of PUCCH format 3 may be used, with as few as 1 OFDM symbols used to carry an ACK/NAK bit. One approach for 1 OFDM symbol long ACK/NAK is to use two different length-12 sequences, one for ACK and one for NAK (=orthogonal signal constellation instead of antipodal, comes at a cost in link budget). For >1 OFDM symbol long ACK/NAK, one can use 1 RS and up to 11 ACK/NAK bits can be transmitted by using a punctured length 24 code from the code given in Table 5.2.2.6.4-1. In particular, by puncturing the first 8 bits in the code, we obtain a length 24 code with minimum distance 7. The codewords from this code can then be used as in PUCCH format 3 in a single slot. The code is given in Table 3.

An alternative to this channel code is to use the current truncation of 32 bit codewords to 24 bit codewords that is used in legacy today when encoding more than 11 ACK/NACK bits in PUCCH format 3.

For the DFT based sPUCCH of length 2-7, the same channel coding approach can be used as was used for the slot-based approach described above. Differences come to the orthogonal sequence length and thus multiplexing capability.

Multiplexing for MC sPUCCH—

We can multiplex one legacy PUCCH format 3 user with three MC sPUCCH users, for example:

The only legacy UE: $[w_0, w_1, w_2, w_3, w_4]=[1\ 1\ 1\ 1\ 1]$
UE1: $[w_3, w_4]=[-1\ 1]$
UE2: $[w_0, w_1, w_2]=[1 e^{j4\pi/3}\ e^{j2\pi/3}]$
UE3: $[w_0, w_1, w_2]=[1 e^{j2\pi/3}\ e^{j4\pi/3}]$ Table 4 depicts the multiplexing example with legacy user and Table 5 gives multiplexing example of only MC sPUCCH. Note that when multiplexing only MC sPUCCH users, that is, when there is separate frequency allocation for sPUCCH users, there is more freedom of selecting in which symbols the DMRS sequence is.

TABLE 4

Multiplexing example of MC sPUCCH with legacy PUCCH format 3.

| User 1 | Legacy PUCCH format 3 | [1 DMRS 1 1 1 DMRS 1] |
| User 2 | MC sPUCCH | [1 DRMS −1] |
| User 3 | MC sPUCCH | [1 $e^{j4\pi/3}$ DMRS $e^{j2\pi/3}$] |
| User 4 | MC sPUCCH | [1 $e^{j2\pi/3}$ DMRS $e^{j4\pi/3}$] |

TABLE 5

Multiplexing example of MC sPUCCH

| User 1 | MC sPUCCH | [1 1 DMRS 1] | |
| User 2 | MC sPUCCH | | [DRMS 1 −1] |
| User 3 | MC sPUCCH | | [DRMS 1 1] |
| User 4 | MC sPUCCH | 1 $e^{j4\pi/3}$ DMRS $e^{j2\pi/3}$] | |
| User 5 | MC sPUCCH | [1 $e^{j2\pi/3}$ DMRS $e^{j4\pi/3}$] | |

Frequency Diversity for MC sPUCCH—

For MC sPUCCH, frequency domain diversity is possible, similarly as for SC sPUCCH. In addition, as it is

TABLE 3

Basis sequences for (24, O) code obtained by puncturing (32, O).

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 1 | 1 | 0 | 0 | 1 | 0 | 1 | 1 |
| 1 | 1 | 0 | 1 | 1 | 1 | 0 | 1 | 0 | 0 | 1 | 1 |
| 2 | 1 | 0 | 1 | 0 | 0 | 1 | 1 | 1 | 0 | 1 | 1 |
| 3 | 1 | 1 | 1 | 0 | 0 | 1 | 1 | 0 | 1 | 0 | 1 |
| 4 | 1 | 0 | 0 | 1 | 0 | 1 | 0 | 1 | 1 | 1 | 1 |
| 5 | 1 | 1 | 0 | 1 | 0 | 1 | 0 | 1 | 0 | 1 | 1 |
| 6 | 1 | 0 | 0 | 1 | 1 | 1 | 0 | 1 | 0 | 0 | 1 |
| 7 | 1 | 1 | 0 | 0 | 1 | 1 | 1 | 1 | 0 | 1 | 1 |
| 8 | 1 | 1 | 1 | 0 | 1 | 1 | 1 | 0 | 0 | 1 | 0 |
| 9 | 1 | 0 | 0 | 1 | 1 | 1 | 0 | 0 | 1 | 0 | 0 |
| 10 | 1 | 1 | 0 | 1 | 1 | 1 | 1 | 0 | 0 | 0 | 0 |
| 11 | 1 | 0 | 0 | 0 | 0 | 1 | 1 | 0 | 0 | 0 | 0 |
| 12 | 1 | 0 | 1 | 0 | 0 | 0 | 1 | 0 | 0 | 0 | 1 |
| 13 | 1 | 1 | 0 | 1 | 0 | 0 | 0 | 0 | 0 | 1 | 1 |
| 14 | 1 | 0 | 0 | 0 | 1 | 0 | 0 | 1 | 1 | 0 | 1 |
| 15 | 1 | 1 | 1 | 0 | 1 | 0 | 0 | 0 | 1 | 1 | 1 |
| 16 | 1 | 1 | 1 | 1 | 1 | 0 | 1 | 1 | 1 | 1 | 0 |
| 17 | 1 | 1 | 0 | 0 | 0 | 1 | 1 | 1 | 0 | 0 | 1 |
| 18 | 1 | 0 | 1 | 1 | 1 | 0 | 0 | 0 | 1 | 1 | 0 |
| 19 | 1 | 1 | 1 | 1 | 0 | 1 | 0 | 1 | 1 | 1 | 1 |
| 20 | 1 | 0 | 1 | 0 | 1 | 1 | 0 | 1 | 0 | 0 | 0 |
| 21 | 1 | 0 | 1 | 1 | 1 | 1 | 1 | 1 | 1 | 0 | 0 |
| 22 | 1 | 1 | 1 | 1 | 1 | 1 | 1 | 1 | 1 | 1 | 1 |
| 23 | 1 | 0 | 0 | 0 | 0 | 0 | 0 | 0 | 0 | 0 | 0 | possible to send MC sPUCCH at multiple non-contiguous frequency allocations, the information bits may be scrambled over an MC sPUCCH that has multiple frequency allocations. Another option is to repeat the same channel coded bits in both slots, for example as shown for user m=2 in the right hand side of FIG. 14.

Handling of Simultaneous Transmission of SSF HARQ ACK/NACK, CSI and SR.

In legacy LTE systems, if the transmission time of ACK/NACK coincides with a transmission time of CQI or SR, there exist different dropping rules in section 7.2 of 3GPP TS 36.213. With a short subframe (SSF), a couple of alternatives exist to handle this situation:

1. CQI or SR transmitted on PUCCH, SSF ACK/NACK transmitted on sPUCCH

This requires that the UE is capable of transmitting PUCCH and sPUCCH at the same time. In legacy, only one PUCCH is transmitted at the time, but this restriction dates back to Rel-8, before availability of DFTS-OFDM UEs. Or another possibility is that when CQI needs to be transmitted in the same subframe where a SSF ACK/NACK is also needed, the UE drops the transmission of CQI on PUCCH and only transmit ACK/NACK on its sPUCCH.

2. CQI or SR and SSF ACK/NACK(s) are transmitted on PUCCH

Up to 20 ACK/NACKs covered by current format 3 on PUCCH. If MIMO & CA is to be supported with SSF, then new format is required to support up to 20×7 ACK/NACKs in case 2 symbol SSF are to be supported. There will also be timing issues with this solution as the transmission of the ACK/NACK will take 1 ms, so the HARQ timing may be different than with SSF ACK/NACK on sPUCCH.

3. CQI or SR and SSF ACK/NACK on sPUCCH

Multiplexing CQI and SR into the sPUCCH will be increasingly challenging the shorter the SSF and duration of sPUCCH. Similar to legacy, the CQI reporting can be dropped when scheduled on sPUCCH at the same time as the UE needs to transmit ACK/NACK or SR. For example, if a UE is scheduled to transmit CQI report on sPUCCH format 2 and needs to transmit ACK/NACK or an SR at the same time it can either.

a. Transmit CQI report and ACK/NACK and/or SR on sPUCCH format 3 if the UE is configured for this, and the number of bits to be transmitted fits into format 3, or b. Drop the CQI report and only transmit ACK/NACK and/or SR.

4. CQI or SR and SSF ACK/NACK on sPUCCH with a simultaneous PUSCH/sPUSCH transmission If the UE is scheduled to transmit CQI reporting and PUSCH/sPUSCH and wants to transmit ACK/NACK and/or SR there are a few alternatives:

a. Transmit ACK/NACK and SR over sPUCCH and CQI report over PUSCH/sPUSCH b. Transmit ACK/NACK over sPUCCH and CQI reporting and SR over PUSCH/sPUSCH.

c. Transmit SR over sPUCCH and CQI reporting and ACK/NACK over PUSCH/sPUSCH.

d. Transmit CQI report over sPUCCH and ACK/NACK and SR over PUSCH/sPUSCH.

e. Transmit ACK/NACK, SR, and CQI report over PUSCH/sPUSCH.

f. If there is no room in PUSCH/sPUSCH for CQI report default to behavior under bullet 3.

SSF HARQ ACK/NACK for the Case DL has Finer Granularity in Time than Uplink

Figure 16:
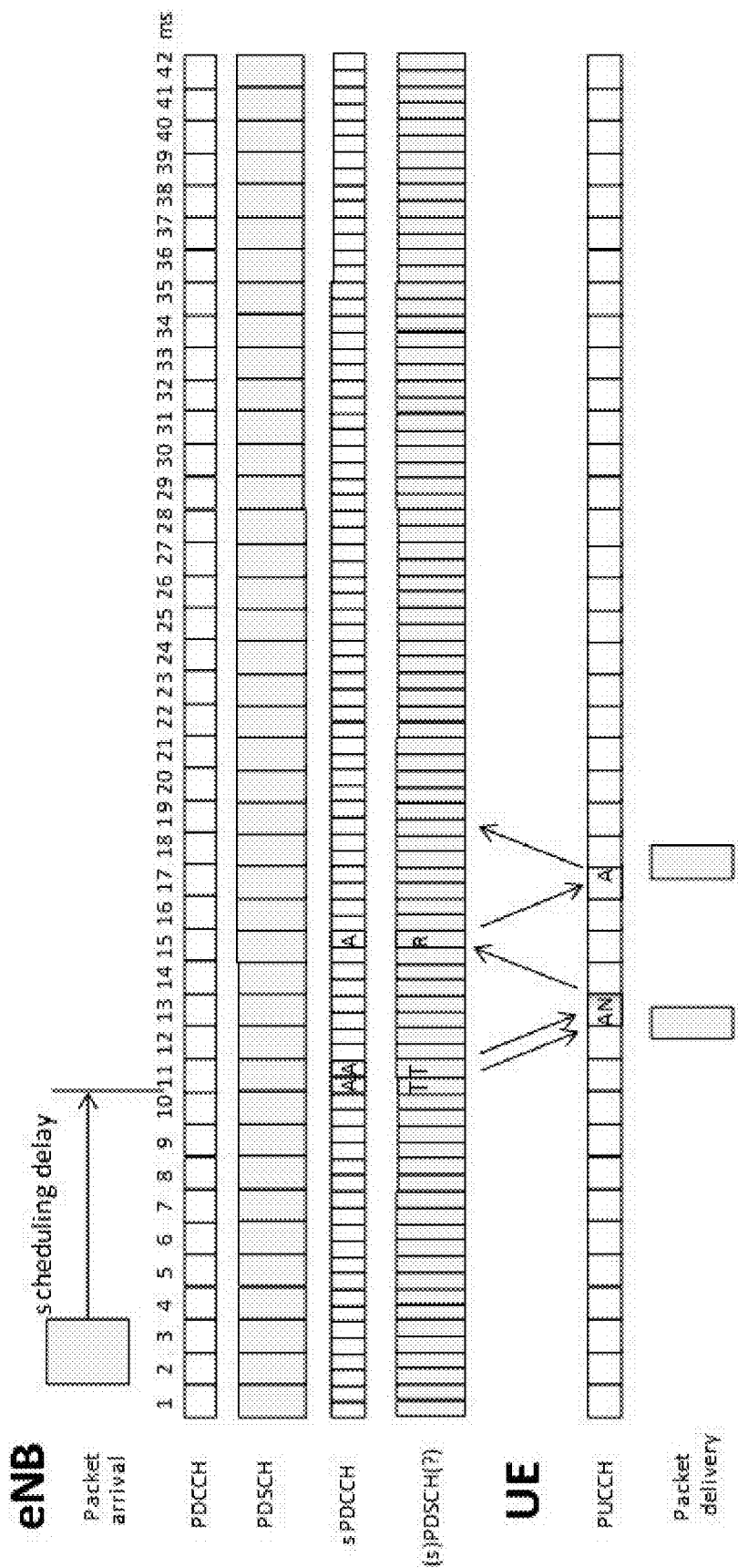
FIG. 16 illustrates a scenario where the downlink has finer transmission granularity than the uplink.

In one example, we have downlink granularity of half of the uplink granularity. In FIG. 16, it is assumed that the first part of sPUCCH is used to acknowledge the "first SSF" and the second part is used to acknowledge the "second SSF". Hence, if only one transmission is received in the "second SSF", then it can start to build the sPUCCH message adding "no acknowledgment" in the first part while processing and understanding what to write in the second part of the sPUCCH message. In FIG. 16, the DL transmission of data is in two SSF transmissions. One transmission is received successfully and one is not. One transmission of the new PUCCH format is used to transmit the HARQ acknowledgements (one ACK and one NACK) for both SSF transmissions. The NACKed data transmission is retransmitted and the new PUCCH format is used to send the acknowledgement for that transmission (in this case only acknowledging transmission of one SSF).

In view of the detailed example embodiments described above, it will be appreciated that FIG. 17 illustrates a generalized method 1700 according to some of the techniques described herein, as implemented in a wireless device that receives a data transmission in a first subframe and acknowledges that transmission with ACK/NACK feedback in a subsequent subframe. This method may be implemented in an LTE UE adapted to carry out the presently disclosed techniques.

As shown at block 1710, the method comprises receiving a first data transmission from a second wireless device in a first subframe interval. It will be appreciated that in some embodiments, the first data transmission is received within a duration that is less than a maximum data transmission duration that is possible within the first subframe interval, e.g., using a sub-subframe allocation of downlink resources. The method further includes, as shown at block 1720, transmitting HARQ feedback and/or CSI to the second wireless device in a subsequent subframe interval, within a duration that is less than a maximum transmission duration that is possible within the subsequent subframe interval.

In some embodiments, the length of the predetermined subframe interval is 1 millisecond and consists of 14 OFDM symbols.

In some embodiments, the transmission of the HARQ feedback and/or CSI occupies exactly one of two slots in the subsequent subframe interval. In some embodiments, transmitting the HARQ feedback and/or CSI comprises: converting one or two bits of HARQ data to a complex-valued number; spreading the complex-valued number over twelve subcarriers using a cyclically-shifted length-12 sequence, to form an array of twelve complex numbers; spreading the array of twelve complex numbers to four SC-FDMA symbols of twelve subcarriers, using a length-four orthogonal spreading code; and mapping the four SC-FDMA symbols to symbols of the one of two slots. In other embodiments, transmitting the HARQ feedback and/or CSI comprises: encoding a plurality of HARQ bits and/or CSI bits to 10 bits, using a channel code; scrambling the encoded bits; modulating the scrambled, encoded bits, using QPSK modulation, to form five QPSK symbols; multiplying each of the five QPSK symbols with a cyclically-shifted length-12 sequence, to obtain five arrays of twelve QPSK symbols; and mapping each of the five arrays of twelve QPSK symbols to a corresponding SC-FDMA symbol of the one of two slots. In some of these latter embodiments, the method further comprises: converting one or two HARQ bits to a complex number; using the complex number to generate a DMRS sequence; and mapping symbols from the generated DMRS symbol sequence to two SC-FDMA symbols of the one of two slots.

In some embodiments, DFT-spread OFDM is used, where the resulting sPUCCH occupies a single slot. In some of these embodiments, transmitting the HARQ feedback and/or CSI comprises: encoding a plurality of HARQ feedback bits and/or CSI bits to 24 bits, using a channel code; scrambling the encoded bits and modulating the scrambled, encoded bits, using QPSK modulation, to form twelve QPSK symbols; inputting the twelve QPSK symbols to a DFT precoder, to form a DFT-spread OFDM symbol (DFTS-OFDM); spreading the OFDM symbol, using a length-five orthogonal spreading sequence, to form five DFTS-OFDM symbols; and transmitting the five DFTS-OFDM symbols in OFDM symbols of the one of two slots.

In some embodiments, sPUCCH may occupy less than a single slot. In some embodiments, then, the subsequent subframe interval consists of a plurality of transmission symbols, and wherein the transmission of the HARQ feedback and/or CSI occupies fewer than all of the transmission symbols in the subsequent subframe interval. In some of these embodiments, the subsequent subframe interval consists of two slots, each slot comprising a plurality of transmission symbols, and wherein the transmission of the HARQ feedback and/or CSI is confined to one of the two slots and occupies fewer than all of the transmission symbols in the one of the two slots.

In some of these embodiments, transmitting the HARQ feedback and/or CSI comprises: convening one or two bits of HARQ data to a complex-valued number; spreading the complex-valued number over twelve subcarriers using a cyclically-shifted length-12 sequence, to form an array of twelve complex numbers; spreading the array of twelve complex numbers to two or more SC-FDMA symbols of twelve subcarriers, using an orthogonal spreading code; and mapping the two or more SC-FDMA symbols to symbols of the subsequent subframe interval. In other embodiments, transmitting the HARQ feedback and/or CSI comprises: converting one or two HARQ bits to a complex number; using the complex number to generate a DMRS sequence; and mapping symbols from the generated DMRS symbol sequence to one or more orthogonal SC-FDMA symbols of the subsequent subframe interval.

In still other embodiments, transmitting the HARQ feedback and/or CSI comprises: encoding a plurality of HARQ feedback bits and/or CSI bits to 24 bits, using a channel code; scrambling the encoded bits and modulating the scrambled, encoded bits, using QPSK modulation, to form twelve QPSK symbols; inputting the twelve QPSK symbols to a DFT precoder, to form an OFDM symbol; spreading the OFDM symbol, using an orthogonal spreading sequence, to form two or more spread OFDM symbols; and transmitting the two or more spread OFDM symbols in OFDM symbols of the subsequent subframe interval. In some of these and in some other embodiments where a multi-carrier sPUCCH is used, transmitting the HARQ feedback and/or CSI comprises transmitting HARQ feedback information and/or CSI information simultaneously using two disjoint frequency resource regions.

Figure 17:
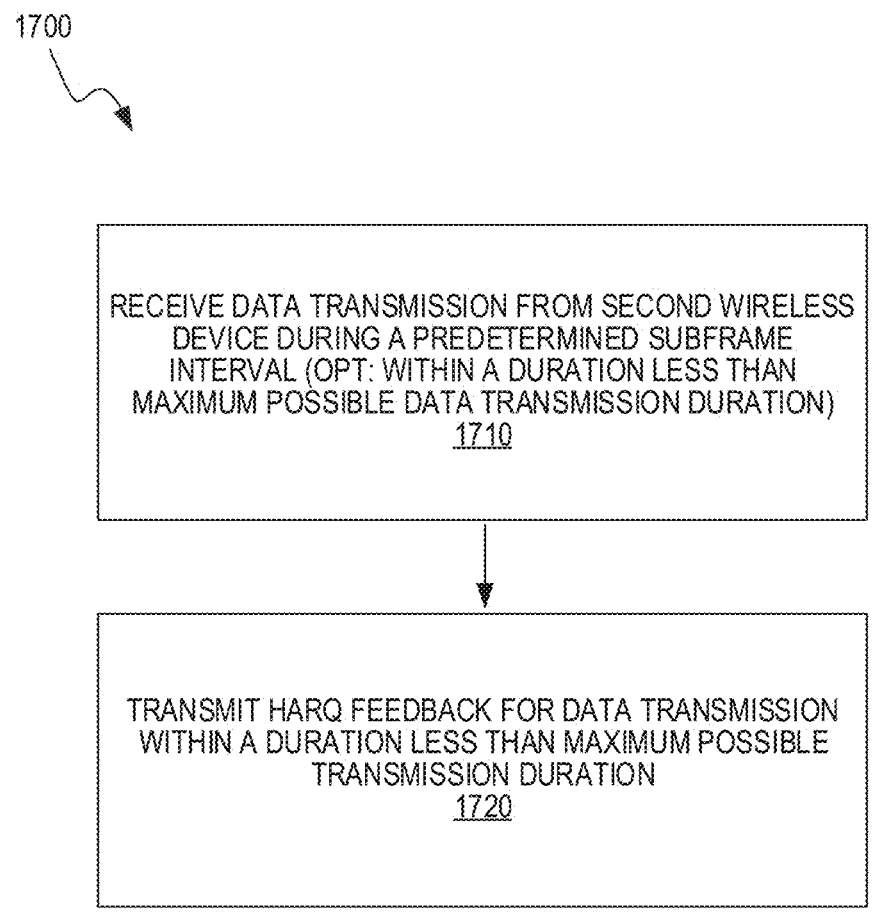
FIG. 17 is a process flow diagram illustrating an example method, according to some embodiments.

In some embodiments of the method 1700 shown in FIG. 17, the method 1700 comprises bundling one or more HARQ feedback bits for the first data transmission with one or more additional HARQ feedback bits for a second data transmission received by the first wireless device. In some of these embodiments, the second data transmission is received in a subframe interval other than the first subframe interval, or is received in a different portion of the first subframe interval than the portion in which the first data transmission is received. In some embodiments, the second data transmission is received by the first wireless device using a different radio-access technology (RAT) from that used for the first data transmission.

Figure 18:
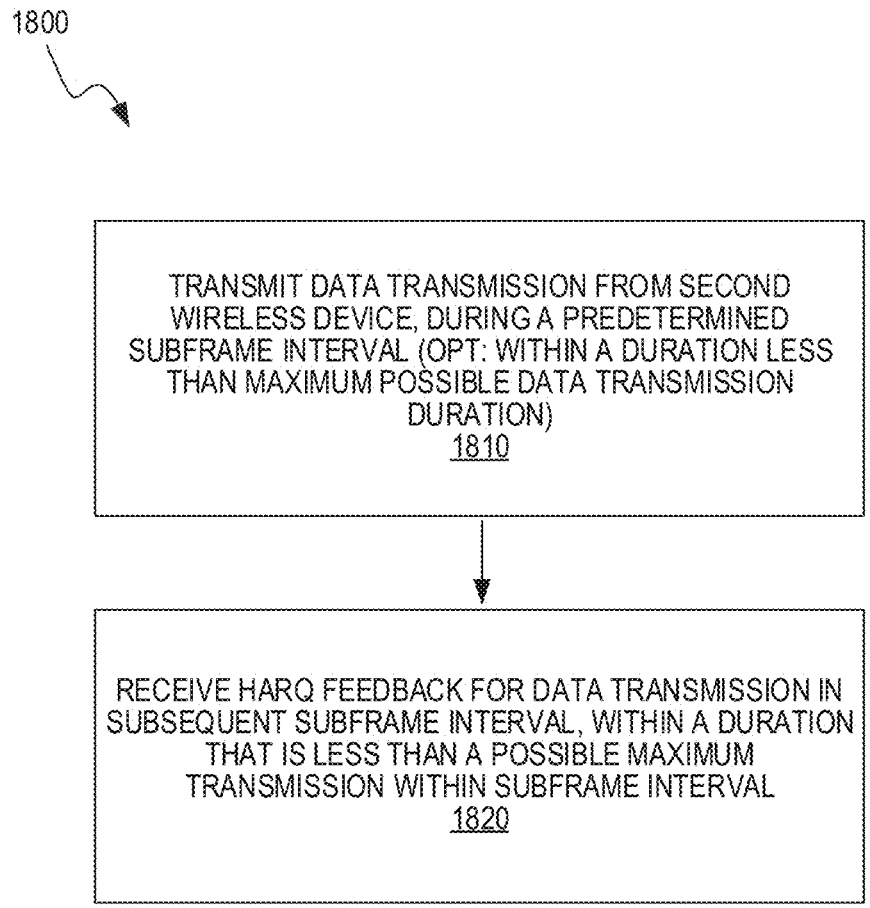
FIG. 18 is a process flow diagram illustrating another example method, according to some embodiments.

FIG. 18 illustrates another generalized method 1800 according to some of the techniques described herein, as implemented in a wireless device that transmits a data transmission in a first subframe and receives an acknowledgement of that transmission in ACK/NACK feedback received in a subsequent subframe. This method might be implemented in an LTE eNodeB adapted to carry out the presently disclosed techniques, for example.

As shown at block 1810, the method includes transmitting a first data transmission to a second wireless device in a first subframe interval. In some instances or in some embodiments, the first data transmission is transmitted within a duration that is less than a maximum data transmission duration that is possible within the first subframe interval. As shown at block 1820, the method further includes receiving HARQ feedback and/or CSI from the second wireless device in a subsequent subframe interval, within a duration that is less than a maximum transmission duration that is possible within the subsequent subframe interval.

In some embodiments, the length of the subsequent subframe interval corresponds to an interval at which scheduling information for transmissions to the second wireless device is exchanged between the first and second wireless devices.

In some embodiments, the received HARQ feedback and/or CSI occupies exactly one of two slots of the subsequent subframe interval. In some of these embodiments, receiving the HARQ feedback and/or CSI comprises: de-mapping four SC-FDMA symbols of twelve subcarriers from symbols of the one of two slots; de-spreading an array of twelve complex numbers from the four SC-FDMA symbols, using a length-four orthogonal spreading code; de-spreading a complex-valued number from the array of twelve complex numbers, using a cyclically-shifted length-12 sequence; and converting the complex-valued number to one or two bits of HARQ data. In others of these embodiments, transmitting the HARQ feedback and/or CSI comprises: de-mapping each of five arrays of twelve QPSK symbols from a corresponding SC-FDMA symbol of the one of two slots; dividing each of the five arrays of twelve QPSK symbols with a cyclically-shifted length-12 sequence, to obtain five QPSK symbols; de-modulating the five QPSK symbols to obtain a set of ten scrambled, encoded bits, using QPSK modulation; unscrambling the scrambled, encoded bits to obtain ten encoded bits; and decoding the ten encoded bits to obtain a plurality of HARQ bits and/or CSI bits. In some of these latter embodiments, the method further comprises de-mapping a sequence of DMRS symbols from two OFDM symbols of the one of two slots; and using the sequence of DMRS symbols to obtain a complex number, and converting the complex number to one or two HARQ bits.

In still other embodiments in which a single slot is used, transmitting the HARQ feedback and/or CSI comprises: receiving five spread OFDM symbols in OFDM symbols of the one of two slots; de-spreading the five spread OFDM symbols, using a length-five orthogonal spreading sequence, to obtain a de-spread OFDM symbol; using an IDFT to obtain twelve QPSK symbols from the OFDM symbol; de-modulating the twelve QPSK symbols to obtain 24 scrambled, encoded bits, and de-scrambling the scrambled, encoded bits to obtain 24 encoded bits; and decoding the 24 encoded bits to obtain a plurality of HARQ feedback bits and/or CSI bits.

In some embodiments, the subsequent subframe interval consists of a plurality of transmission symbols, and wherein the received HARQ feedback and/or CSI occupies fewer than all of the transmission symbols of the subsequent subframe interval. In some of these embodiments, the subsequent subframe interval consists of two slots, each slot comprising a plurality of transmission symbols, and wherein the transmission of the HARQ feedback and/or CSI is confined to one of the two slots and occupies fewer than all of the transmission symbols in the one of the two slots. In some of these embodiments, receiving the HARQ feedback and/or CSI comprises: de-mapping two or more SC-FDMA symbols of twelve subcarriers from symbols of the one of two slots; de-spreading an array of twelve complex numbers from the two or more SC-FDMA symbols, using an orthogonal spreading code; de-spreading a complex-valued number from the array of twelve complex numbers, using a cyclically-shifted length-12 sequence; and converting the complex-valued number to one or two bits of HARQ data. In others, receiving the HARQ feedback and/or CSI comprises: de-mapping a DMRS symbol sequence from one or more SC-FDMA symbols of the subsequent subframe interval; using the de-mapped DMRS symbol sequence to obtain a complex number, and converting the complex number to one or two HARQ bits. In still others, receiving the HARQ feedback and/or CSI comprises: receiving two or more spread OFDM symbols in OFDM symbols of the one of two slots; de-spreading the two or more spread OFDM symbols, using an orthogonal spreading sequence, to obtain a de-spread OFDM symbol; using an IDFT to obtain twelve QPSK symbols from the OFDM symbol; de-modulating the twelve QPSK symbols to obtain 24 scrambled, encoded bits, and de-scrambling the scrambled, encoded bits to obtain 24 encoded bits; and decoding the 24 encoded bits to obtain a plurality of HARQ feedback bits and/or CSI bits.

In some embodiments, receiving the HARQ feedback and/or CSI comprises simultaneously receiving HARQ feedback information and/or CSI information from each of two disjoint frequency resource regions. In some embodiments, the method further comprises unbundling, from the received HARQ feedback and/or CSI, one or more HARQ feedback bits for the first data transmission and one or more additional HARQ feedback bits for a second data transmission transmitted to the second wireless device. In some of these latter embodiments, the second data transmission is transmitted in a subframe interval other than the first subframe interval, or is transmitted in a different portion of the first subframe interval than the portion in which the first data transmission is received, or the second data transmission is transmitted to the second wireless device using a different RAT from that used for the first data transmission.

The functions in the various techniques and process flow diagrams discussed above may be implemented using electronic data processing circuitry provided in a mobile terminal and in a base station, or in multiple wireless devices. Each mobile terminal and base station, of course, also includes suitable radio circuitry for receiving and transmitting radio signals formatted in accordance with known formats and protocols, such as the LTE formats and protocols.

Figure 19:
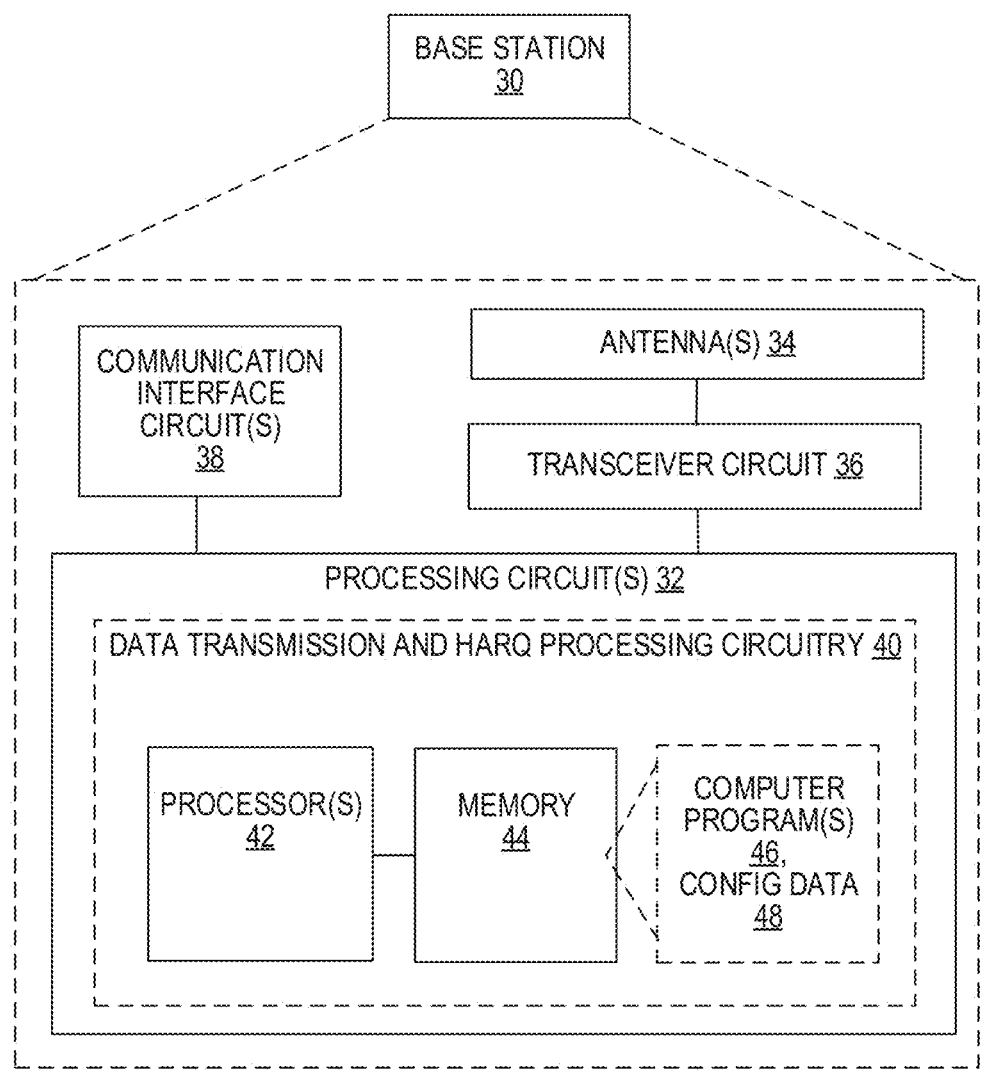
FIG. 19 illustrates an example base station, according to some embodiments.

FIG. 19 illustrates a diagram of an example radio base station 30, according to some embodiments. The base station 30 provides an air interface to wireless devices, e.g., an LTE air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards. GSM, general packet radio service (GPRS), wideband code division multiple access (WCDMA), high-speed downlink packet access (HSDPA). LTE and LTE-Advanced. The base station 30 may also include a communication interface circuit 38 for communicating with nodes in the core network such as a network node, other peer radio nodes, and/or other types of nodes in the network. The base station 30 may be, for example, an eNodeB.

The base station 30 also includes one or more processing circuits 32 that are operatively associated with the communication interface circuit 38 and transceiver circuit 36. The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 32 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the base station 30.

The processor 42 may execute a computer program 46 stored in the memory 44 that configures the processor 42 to transmit a first data transmission to a wireless device in a first subframe interval, and to receive HARQ feedback and/or CSI from the wireless device in a subsequent subframe interval, within a duration that is less than a maximum transmission duration that is possible within the subsequent subframe interval. This functionality may be performed by Data Transmission and HARQ Processing Circuit 40 in the processing circuit 32. Of course, the processor circuit 32 may be configured to carry out any of the variants of the methods described above.

Figure 20:
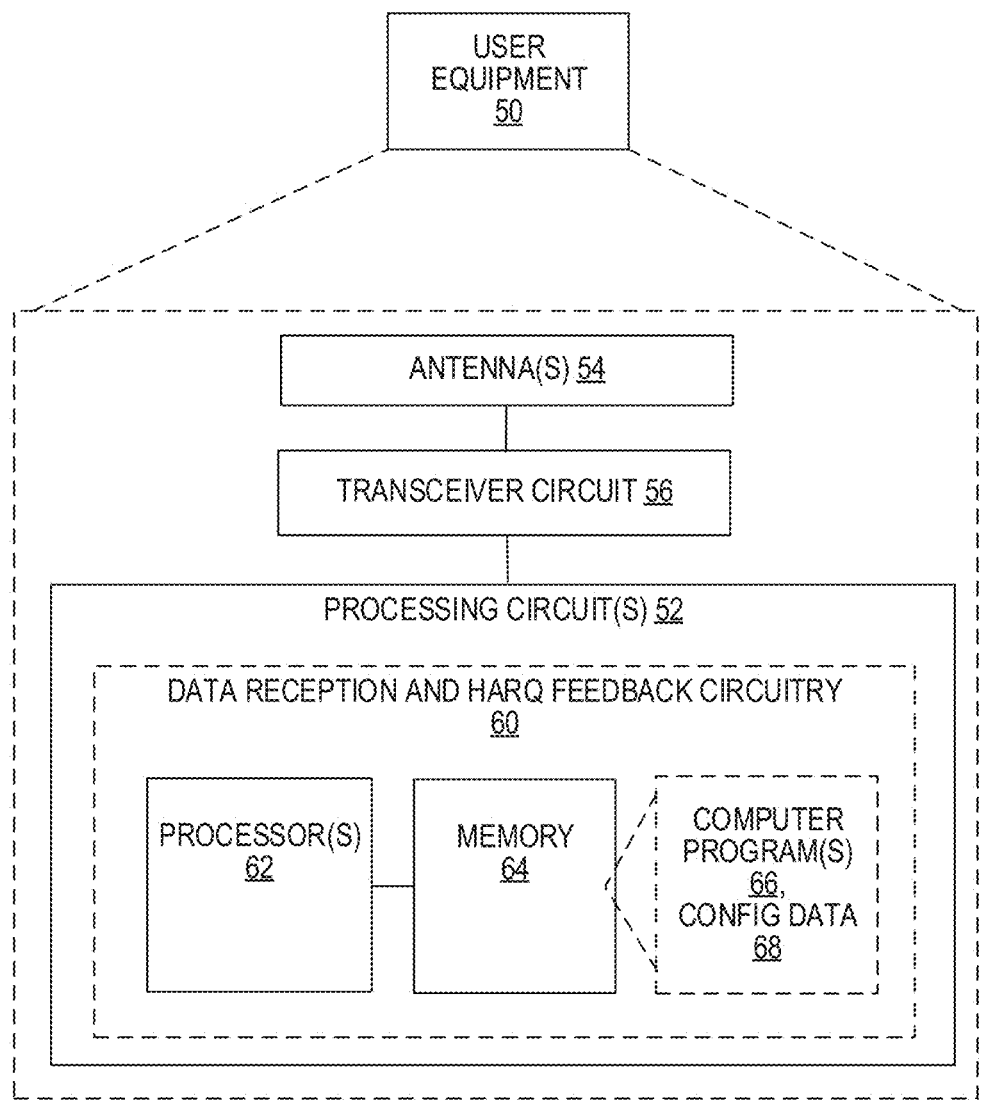
FIG. 20 illustrates an example UE, according to some embodiments.

FIG. 20 illustrates a diagram of a wireless device, such as a user equipment 50, according to some embodiments. To ease explanation, the user equipment 50 may also be considered to represent any wireless devices that perform machine to machine (M2M) communications or machine-type communication (MTC). The user equipment 50 communicates with a radio node or base station, such as base station 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced.

The user equipment 50 also includes one or more processing circuits 52 that are operatively associated with the radio transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The processor 62 of the processor circuit 52 may execute a computer program 66 stored in the memory 64 that configures the processor 62 to receive a first data transmission from a second wireless device, such as base station 30, in a first subframe interval, and to transmit HARQ feedback and/or CSI to the second wireless device in a subsequent subframe interval, within a duration that is less than a maximum transmission duration that is possible within the subsequent subframe interval. This structure and functionality may be referred to as Data Reception and HARQ Feedback Circuitry 60 in processing circuit 52. Of course, the processor circuit 52 may be configured to carry out any of the variants of the methods described above.

Figure 21:
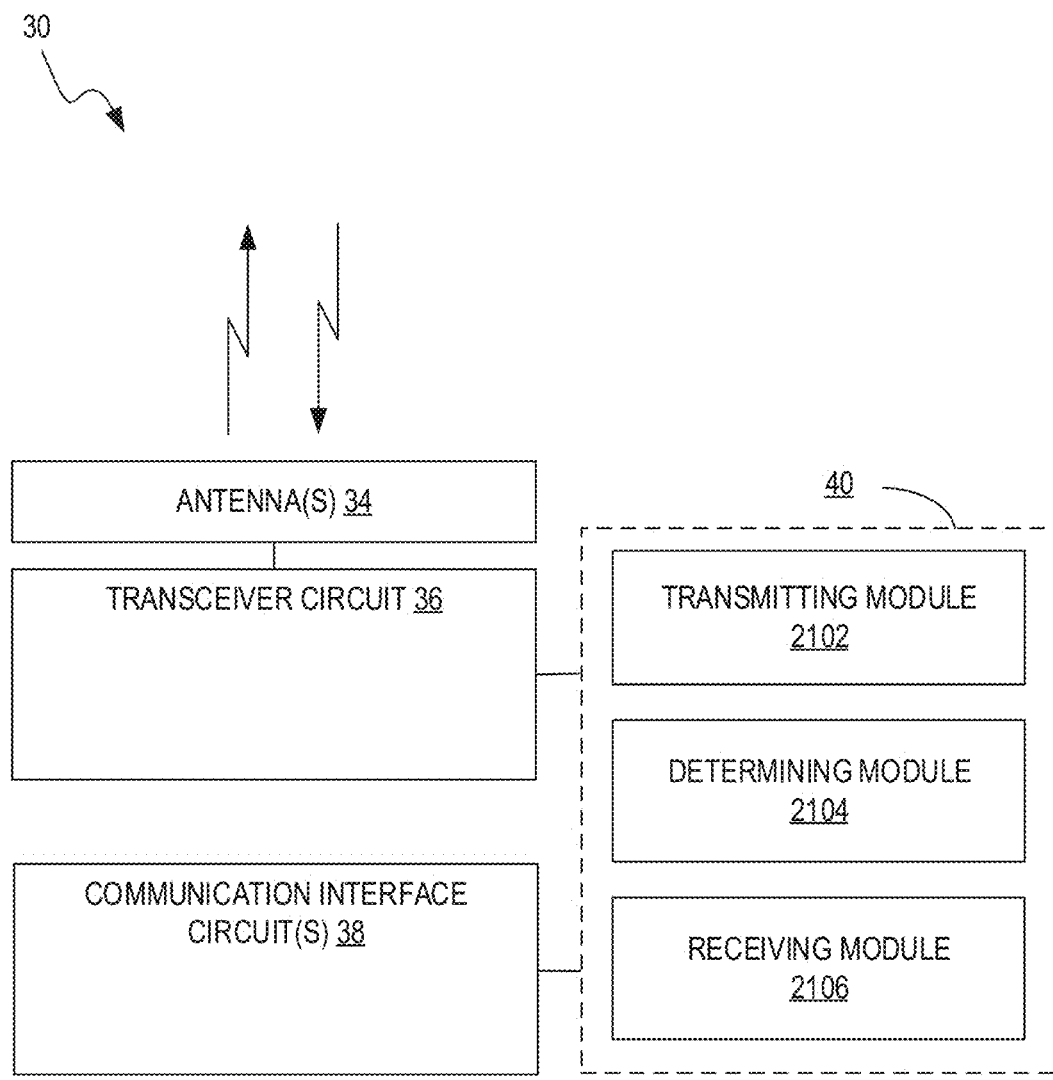
FIG. 21 is a functional illustration of a wireless device, according to some embodiments.

FIG. 21 illustrates an example functional module or circuit architecture as may be implemented in the base station 30, e.g., based on the processing circuitry 40. The illustrated embodiment at least functionally includes a transmitting module 2102 for transmitting a first data transmission to a second wireless device, in a first subframe interval. The embodiment also includes a receiving module 2106 for receiving HARQ feedback and/or CSI from the second wireless device in a subsequent subframe interval, within a duration that is less than a maximum transmission duration that is possible within the subsequent subframe interval. The illustrated embodiment also includes a determining module 2104 for determining a transmission time for receiving HARQ feedback from the second wireless device, for example.

Figure 22:
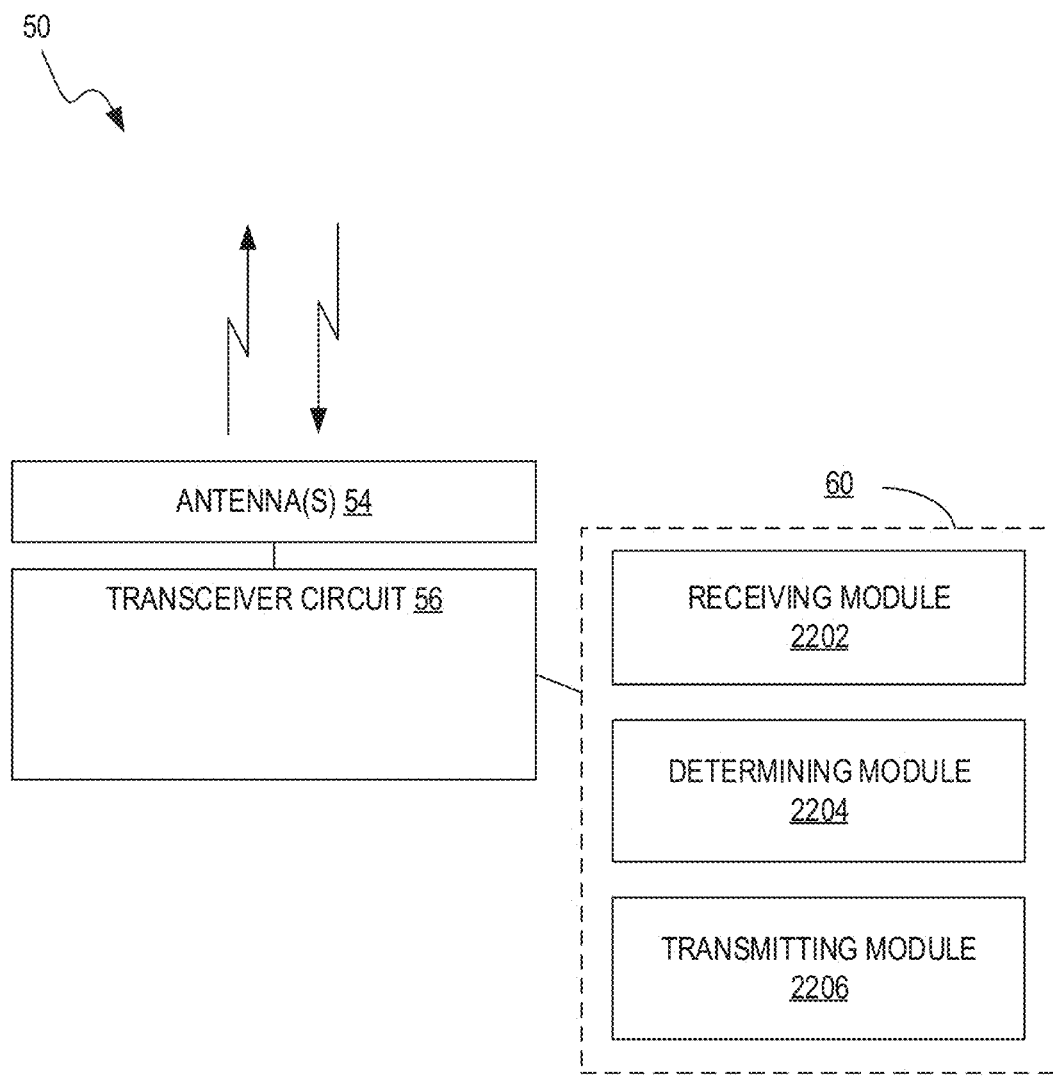
FIG. 22 is a functional illustration of another example wireless device, according to some embodiments.

FIG. 22 illustrates an example functional module or circuit architecture as may be implemented in the user equipment 50, e.g., based on the processing circuitry 60. The illustrated embodiment at least functionally includes a receiving module 2202 for receiving a first data transmission from a second wireless device, in a first subframe interval. The embodiment also includes a transmitting module 2206 for transmitting HARQ feedback and/or CSI to the second wireless device in a subsequent subframe interval, within a duration that is less than a maximum transmission duration that is possible within the subsequent subframe interval. The illustrated embodiment also includes a determining module 2204—this module may be configured to determine a transmission time for transmitting HARQ feedback to the second wireless device, for example.

It will be appreciated by the person of skill in the art that various modifications may be made to the above described embodiments without departing from the scope of the presently described techniques. For example, it will be readily appreciated that although the above embodiments are described with reference to parts of a 3GPP network, other embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

In the above discussion, specific details of particular embodiments of the presently disclosed techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to ASIC and/or FPGAs, and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Because it is not possible, of course, to describe every conceivable combination of components or techniques, those skilled in the art will appreciate that the techniques described above can be implemented in other ways than those specifically set forth herein, without departing from essential characteristics of the techniques. The present embodiments are thus to be considered in all respects as illustrative and not restrictive.

What is claimed is:

1. A method, in a first wireless device, the method comprising:
   receiving a first data transmission from a second wireless device in a first subframe interval; and
   transmitting hybrid automatic repeat request (HARQ) feedback and channel state information (CSI) to the second wireless device in a subsequent subframe interval, within a duration that is less than a maximum transmission duration that is possible within the subsequent subframe interval.

2. The method of claim 1, wherein the first data transmission is received within a duration that is less than a maximum data transmission duration that is possible within the first subframe interval.

3. The method of claim 1, wherein the maximum transmission duration that is possible within the subsequent subframe interval is 1 millisecond and consists of 14 orthogonal frequency-division multiplexing (OFDM) symbols.

4. The method of claim 1, wherein the transmission of the HARQ feedback and CSI occupies exactly one of two slots in the subsequent subframe interval.

5. The method of claim 4, wherein transmitting the HARQ feedback and CSI comprises:
   converting one or two bits of HARQ data to a complex-valued number;
   spreading the complex-valued number over twelve subcarriers using a cyclically-shifted length-12 sequence, to form an array of twelve complex numbers;
   spreading the array of twelve complex numbers to four single carrier frequency-division multiple access (SC-FDMA) symbols of twelve subcarriers, using a length-four orthogonal spreading code; and
   mapping the four SC-FDMA symbols to symbols of the one of two slots.

6. The method of claim 4, wherein transmitting the HARQ feedback and CSI comprises:
   encoding a plurality of HARQ bits and CSI bits to 10 bits, using a channel code;
   scrambling the encoded bits;
   modulating the scrambled, encoded bits, using quadrature-phase-shift-keying (QPSK) modulation, to form five QPSK symbols;
   multiplying each of the five QPSK symbols with a cyclically-shifted length-12 sequence, to obtain five arrays of twelve QPSK symbols; and
   mapping each of the five arrays of twelve QPSK symbols to a corresponding single carrier frequency-division multiple access (SC-FDMA) symbol of the one of two slots.

7. The method of claim 6, further comprising:
   converting one or two HARQ bits to a complex number;
   using the complex number to generate a demodulation reference symbol (DMRS) sequence; and
   mapping symbols from the generated DMRS sequence to two SC-FDMA symbols of the one of two slots.

8. The method of claim 4, wherein transmitting the HARQ feedback and CSI comprises:
   encoding a plurality of HARQ feedback bits and CSI bits to 24 bits, using a channel code;
   scrambling the encoded bits and modulating the scrambled, encoded bits, using quadrature-phase-shift-keying (QPSK) modulation, to form twelve QPSK symbols;
   inputting the twelve QPSK symbols to a discrete-Fourier-transform (DFT) precoder, to form a DFT-spread OFDM (DFTS-OFDM) symbol;
   spreading the OFDM symbol, using a length-five orthogonal spreading sequence, to form five DFTS-OFDM symbols; and
   transmitting the five DFTS-OFDM symbols in OFDM symbols of the one of two slots.

9. The method of claim 1, wherein the subsequent subframe interval consists of a plurality of transmission symbols, and wherein the transmission of the HARQ feedback and CSI occupies fewer than all of the transmission symbols in the subsequent subframe interval.

10. The method of claim 9, wherein the subsequent subframe interval consists of two slots, each slot comprising a plurality of transmission symbols, and wherein the transmission of the HARQ feedback and CSI is confined to one of the two slots and occupies fewer than all of the transmission symbols in the one of the two slots.

11. The method of claim 9, wherein transmitting the HARQ feedback and CSI comprises:
    converting one or two bits of HARQ data to a complex-valued number;
    spreading the complex-valued number over twelve subcarriers using a cyclically-shifted length-12 sequence, to form an array of twelve complex numbers;
    spreading the array of twelve complex numbers to two or more single carrier frequency-division multiple access (SC-FDMA) symbols of twelve subcarriers, using an orthogonal spreading code; and
    mapping the two or more SC-FDMA symbols to symbols of the subsequent subframe interval.

12. The method of claim 9, wherein transmitting the HARQ feedback and CSI comprises:
    converting one or two HARQ bits to a complex number;
    using the complex number to generate a demodulation reference symbol (DMRS) sequence; and
    mapping symbols from the generated DMRS sequence to one or more orthogonal single carrier frequency-division multiple access (SC-FDMA) symbols of the subsequent subframe interval.

13. The method of claim 9, wherein transmitting the HARQ feedback and CSI comprises:
    encoding a plurality of HARQ feedback bits and CSI bits to 24 bits, using a channel code;
    scrambling the encoded bits and modulating the scrambled, encoded bits, using quadrature-phase-shift-keying (QPSK) modulation, to form twelve QPSK symbols;
    inputting the twelve QPSK symbols to a discrete-Fourier-transform (DFT) precoder, to form an OFDM symbol;
    spreading the OFDM symbol, using an orthogonal spreading sequence, to form two or more spread OFDM symbols; and
    transmitting the two or more spread OFDM symbols in OFDM symbols of the subsequent subframe interval.

14. The method of claim 1, wherein transmitting the HARQ feedback and CSI comprises transmitting HARQ feedback information and CSI information simultaneously using two disjoint frequency resource regions.

15. The method of claim 1, wherein the method comprises bundling one or more HARQ feedback bits for the first data transmission with one or more additional HARQ feedback bits for a second data transmission received by the first wireless device.

16. The method of claim 15, wherein the second data transmission is received in a subframe interval other than the first subframe interval, or is received in a different portion of the first subframe interval than the portion in which the first data transmission is received.

17. The method of claim 15, wherein the second data transmission is received by the first wireless device using a different radio-access technology (RAT) from that used for the first data transmission.

18. A method, in a first wireless device, the method comprising:
   transmitting a first data transmission to a second wireless device in a first subframe interval; and
   receiving hybrid automatic repeat request (HARQ) feedback and channel state information (CSI) from the second wireless device in a subsequent subframe interval, within a duration that is less than a maximum transmission duration that is possible within the subsequent subframe interval.

19. The method of claim 18, wherein the first data transmission is transmitted within a duration that is less than a maximum data transmission duration that is possible within the first subframe interval.

20. The method of claim 18, wherein the length of the subsequent subframe interval corresponds to an interval at which scheduling information for transmissions to the second wireless device is exchanged between the first and second wireless devices.

21. The method of claim 18, wherein the received HARQ feedback and CSI occupies exactly one of two slots of the subsequent subframe interval.

22. The method of claim 21, wherein receiving the HARQ feedback and CSI comprises:
   de-mapping four single-carrier frequency-division multiple access (SC-FDMA) symbols of twelve subcarriers from symbols of the one of two slots;
   de-spreading an array of twelve complex numbers from the four SC-FDMA symbols, using a length-four orthogonal spreading code;
   de-spreading a complex-valued number from the array of twelve complex numbers, using a cyclically-shifted length-12 sequence; and
   converting the complex-valued number to one or two bits of HARQ data.

23. The method of claim 21, wherein receiving the HARQ feedback and CSI comprises:
   de-mapping each of five arrays of twelve quadrature-phase-shift-keying (QPSK) symbols from a corresponding single-carrier frequency-division multiple access (SC-FDMA) symbol of the one of two slots;
   dividing each of the five arrays of twelve QPSK symbols with a cyclically-shifted length-12 sequence, to obtain five QPSK symbols;
   de-modulating the five QPSK symbols to obtain a set of ten scrambled, encoded bits, using quadrature-phase-shift-keying (QPSK) modulation;
   unscrambling the scrambled, encoded bits to obtain ten encoded bits; and
   decoding the ten encoded bits to obtain a plurality of HARQ bits and CSI bits.

24. The method of claim 23, further comprising:
   de-mapping a sequence of demodulation reference symbol (DMRS) symbols from two OFDM symbols of the one of two slots;
   using the sequence of DMRS symbols to obtain a complex number; and
   converting the complex number to one or two HARQ bits.

25. The method of claim 21, wherein receiving the HARQ feedback and CSI comprises:
   receiving five spread orthogonal frequency-division multiplexing (OFDM) symbols in OFDM symbols of the one of two slots;
   de-spreading the five spread OFDM symbols, using a length-five orthogonal spreading sequence, to obtain a de-spread OFDM symbol;
   using an inverse discrete-Fourier-transform (IDFT) to obtain twelve quadrature-phase-shift-keying (QPSK) symbols from the OFDM symbol;
   de-modulating the twelve QPSK symbols to obtain 24 scrambled, encoded bits, and de-scrambling the scrambled, encoded bits to obtain 24 encoded bits; and
   decoding the 24 encoded bits to obtain a plurality of HARQ feedback bits and CSI bits.

26. The method of claim 18, wherein the subsequent subframe interval consists of a plurality of transmission symbols, and wherein the received HARQ feedback and CSI occupies fewer than all of the transmission symbols of the subsequent subframe interval.

27. The method of claim 26, wherein the subsequent subframe interval consists of two slots, each slot comprising a plurality of transmission symbols, and wherein the transmission of the HARQ feedback and CSI is confined to one of the two slots and occupies fewer than all of the transmission symbols in the one of the two slots.

28. The method of claim 26, wherein receiving the HARQ feedback and CSI comprises:
   de-mapping two or more single-carrier frequency-division multiple access (SC-FDMA) symbols of twelve subcarriers from symbols of the one of two slots;
   de-spreading an array of twelve complex numbers from the two or more SC-FDMA symbols, using an orthogonal spreading code;
   de-spreading a complex-valued number from the array of twelve complex numbers, using a cyclically-shifted length-12 sequence; and
   converting the complex-valued number to one or two bits of HARQ data.

29. The method of claim 26, wherein receiving the HARQ feedback and CSI comprises:
   de-mapping a demodulation reference symbol (DMRS) symbol sequence from one or more single-carrier frequency-division multiple access (SC-FDMA) symbols of the subsequent subframe interval;
   using the de-mapped DMRS symbol sequence to obtain a complex number; and
   converting the complex number to one or two HARQ bits.

30. The method of claim 26, wherein receiving the HARQ feedback and CSI comprises:
   receiving two or more spread orthogonal frequency-division multiplexing (OFDM) symbols in OFDM symbols of the one of two slots;
   de-spreading the two or more spread OFDM symbols, using an orthogonal spreading sequence, to obtain a de-spread OFDM symbol;
   using an inverse discrete-Fourier-transform (IDFT) to obtain twelve quadrature-phase-shift-keying (QPSK) symbols from the OFDM symbol;

de-modulating the twelve QPSK symbols to obtain 24 scrambled, encoded bits, and de-scrambling the scrambled, encoded bits to obtain 24 encoded bits; and decoding the 24 encoded bits to obtain a plurality of HARQ feedback bits and CSI bits.

31. The method of claim 18, wherein receiving the HARQ feedback and CSI comprises simultaneously receiving HARQ feedback information and CSI information from each of two disjoint frequency resource regions.

32. The method of claim 18, wherein the method further comprises unbundling, from the received HARQ feedback and CSI, one or more HARQ feedback bits for the first data transmission and one or more additional HARQ feedback bits for a second data transmission transmitted to the second wireless device.

33. The method of claim 32, wherein the second data transmission is transmitted in a subframe interval other than the first subframe interval, or is transmitted in a different portion of the first subframe interval than the portion in which the first data transmission is received.

34. The method of claim 32, wherein the second data transmission is transmitted to the second wireless device using a different radio-access technology (RAT) from that used for the first data transmission.

35. A wireless device apparatus comprising a transceiver circuit and a processing circuit, wherein the processing circuit is configured to:

receive a first data transmission from a second wireless device in a first subframe interval, using the transceiver circuit; and transmit hybrid automatic repeat request (HARQ) feedback and channel state information (CSI) to the second wireless device in a subsequent subframe interval, using the transceiver circuit, within a duration that is less than a maximum transmission duration that is possible within the subsequent subframe interval.

36. The wireless device apparatus of claim 35, wherein the wireless device apparatus is a base station.

37. The wireless device apparatus of claim 35, wherein the wireless device apparatus is a user equipment.

38. A wireless device apparatus comprising a transceiver circuit and a processing circuit, wherein the processing circuit is configured to:

transmit a first data transmission to a second wireless device in a first subframe interval, using the transceiver circuit; and receive hybrid automatic repeat request (HARQ) feedback and channel state information (CSI) from the second wireless device in a subsequent subframe interval, using the transceiver, within a duration that is less than a maximum transmission duration that is possible within the subsequent subframe interval.

39. The wireless device apparatus of claim 38, wherein the wireless device apparatus is a base station.

40. The wireless device apparatus of claim 38, wherein the wireless device apparatus is a user equipment.

41. A non-transitory computer-readable medium comprising, stored thereupon, a computer program product comprising program instructions that, when executed by a processing circuit in a wireless device, cause the wireless device to:

receive a first data transmission from a second wireless device in a first subframe interval, using a transceiver circuit; and transmit hybrid automatic repeat request (HARQ) feedback and channel state information (CSI) to the second wireless device in a subsequent subframe interval, using the transceiver circuit, within a duration that is less than a maximum transmission duration that is possible within the subsequent subframe interval.

* * * * *